United States Patent
Uemura et al.

(10) Patent No.: US 8,090,267 B2
(45) Date of Patent: Jan. 3, 2012

(54) COMPLEMENTARY OPTICAL WIRING APPARATUS

(75) Inventors: Hiroshi Uemura, Yokohama (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 12/504,139

(22) Filed: Jul. 16, 2009

(65) Prior Publication Data

US 2010/0021180 A1    Jan. 28, 2010

(30) Foreign Application Priority Data

Jul. 24, 2008 (JP) ................................ 2008-191022

(51) Int. Cl.
    *H04B 10/00* (2006.01)
(52) U.S. Cl. ......... 398/141; 398/164; 398/140; 398/183
(58) Field of Classification Search .......... 398/140–172, 398/182–201
    See application file for complete search history.

(56) References Cited

U.S. PATENT DOCUMENTS

| | | | | |
|---|---|---|---|---|
| 3,486,029 A | * | 12/1969 | Claflin et al. | 398/115 |
| 4,052,611 A | * | 10/1977 | Fish | 398/145 |
| 4,292,551 A | * | 9/1981 | Kolmann | 327/514 |
| 4,393,518 A | * | 7/1983 | Briley | 398/145 |
| 4,497,068 A | * | 1/1985 | Fischer | 398/191 |
| 4,577,207 A | * | 3/1986 | Copeland | 257/90 |
| 4,784,001 A | * | 11/1988 | Gaertner | 73/861.12 |
| 5,023,945 A | * | 6/1991 | Childs | 398/161 |
| 5,060,306 A | * | 10/1991 | Nakamura et al. | 398/183 |
| 5,126,871 A | * | 6/1992 | Jeffers | 398/145 |
| 5,138,475 A | * | 8/1992 | Bergmann et al. | 398/41 |
| 5,550,864 A | * | 8/1996 | Toy et al. | 375/293 |
| 5,673,130 A | * | 9/1997 | Sundstrom et al. | 398/154 |
| 5,790,286 A | * | 8/1998 | Bae | 398/5 |

(Continued)

FOREIGN PATENT DOCUMENTS

JP    3-58532    3/1991

(Continued)

OTHER PUBLICATIONS

Hideto Furuyama, et al., "A Complementary Optical Interconnection for Inter-Chip Networks", IECE Trans. Electron., vol. E76-C, No. 1, Jan. 1993, pp. 112-117.

(Continued)

*Primary Examiner* — Agustin Bello
(74) *Attorney, Agent, or Firm* — Oblon, Spivak, McClelland, Maier & Neustadt, L.L.P.

(57) ABSTRACT

A complementary optical wiring apparatus includes an optical transmitter, first and second optical transmission lines, and an optical receiver, the optical transmitter has a first operation mode of transmitting an optical signal synchronized with the rising of one electrical input signal via the first optical transmission line and transmitting an optical signal synchronized with the falling thereof via the second optical transmission line, and a second operation mode of transmitting an optical signal synchronized with the rising and falling of one of two electrical input signals via the first optical transmission line and transmitting an optical signal synchronized with the rising and falling of the other electrical input signal via the second optical transmission line, and is operated after one of the two operation modes is selected.

20 Claims, 17 Drawing Sheets

U.S. PATENT DOCUMENTS

| | | | | |
|---|---|---|---|---|
| 5,838,471 | A * | 11/1998 | Beard | 398/136 |
| 6,310,707 | B1 * | 10/2001 | Kawase et al. | 398/119 |
| 6,365,911 | B1 * | 4/2002 | Furuyama | 257/25 |
| 6,619,866 | B1 * | 9/2003 | Sun et al. | 398/141 |
| 7,492,981 | B2 * | 2/2009 | Furuyama | 385/14 |
| 7,792,433 | B2 * | 9/2010 | Bai | 398/183 |
| 2008/0205903 | A1 * | 8/2008 | Yonenaga et al. | 398/186 |
| 2009/0310978 | A1 * | 12/2009 | Uemura et al. | 398/195 |
| 2010/0021180 | A1 * | 1/2010 | Uemura et al. | 398/183 |
| 2010/0142976 | A1 * | 6/2010 | Uemura et al. | 398/183 |

FOREIGN PATENT DOCUMENTS

| | | |
|---|---|---|
| JP | 2001-285195 | 10/2001 |
| JP | 2004-153442 | 5/2004 |

OTHER PUBLICATIONS

U.S. Appl. No. 12/561,560, filed Sep. 17, 2009, Uemura, et al.

* cited by examiner

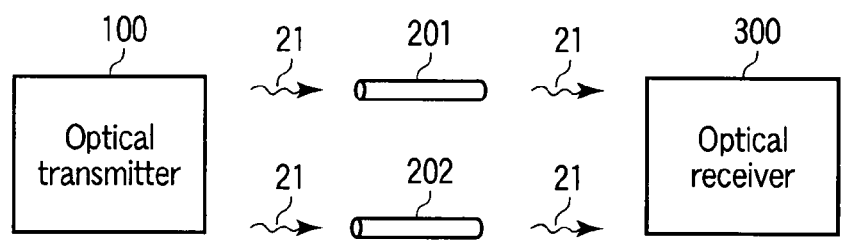
F I G. 1
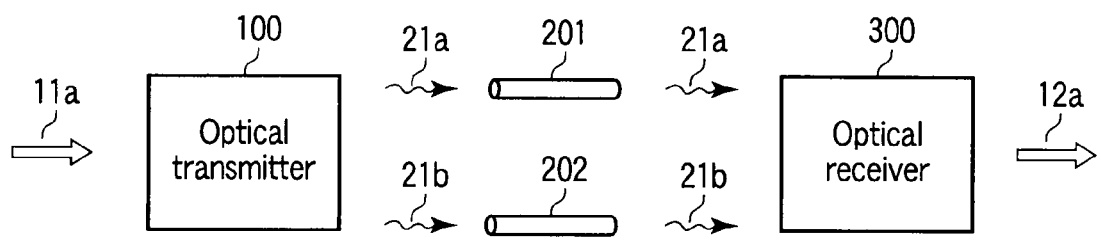
F I G. 2A
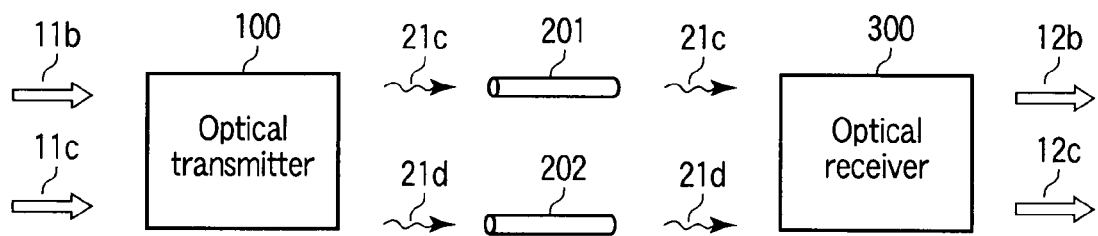
F I G. 2B

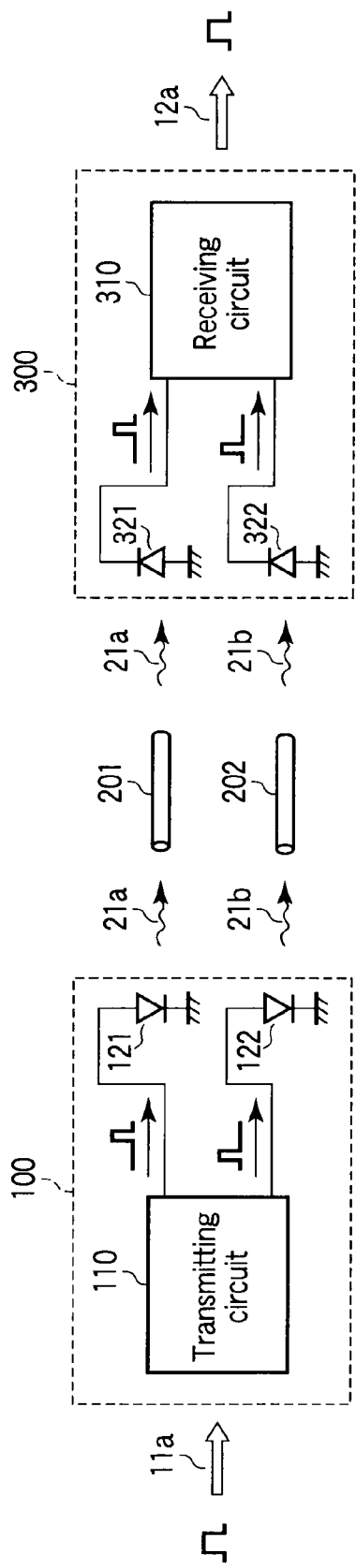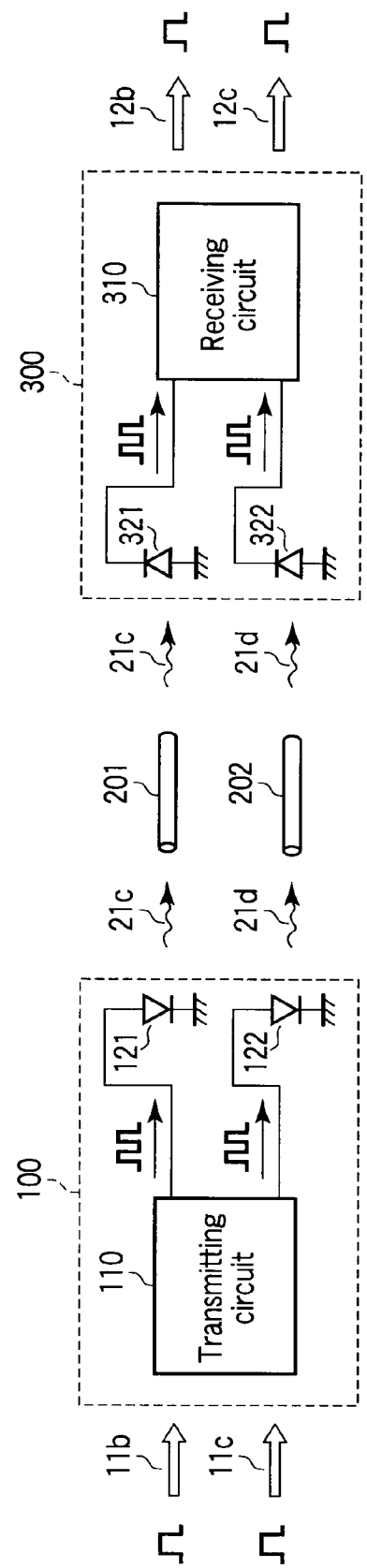
FIG. 3A
FIG. 3B

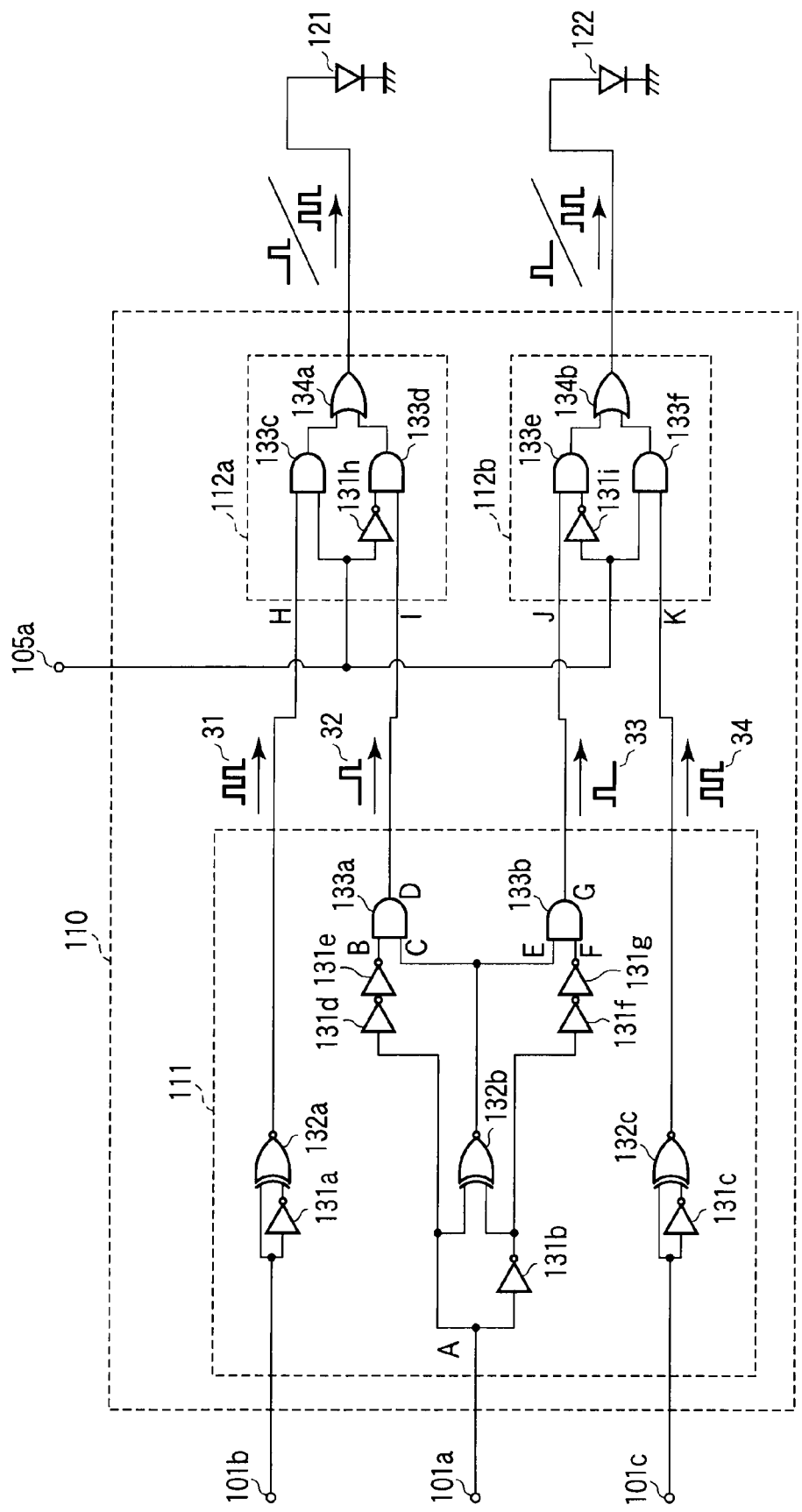
F I G. 5

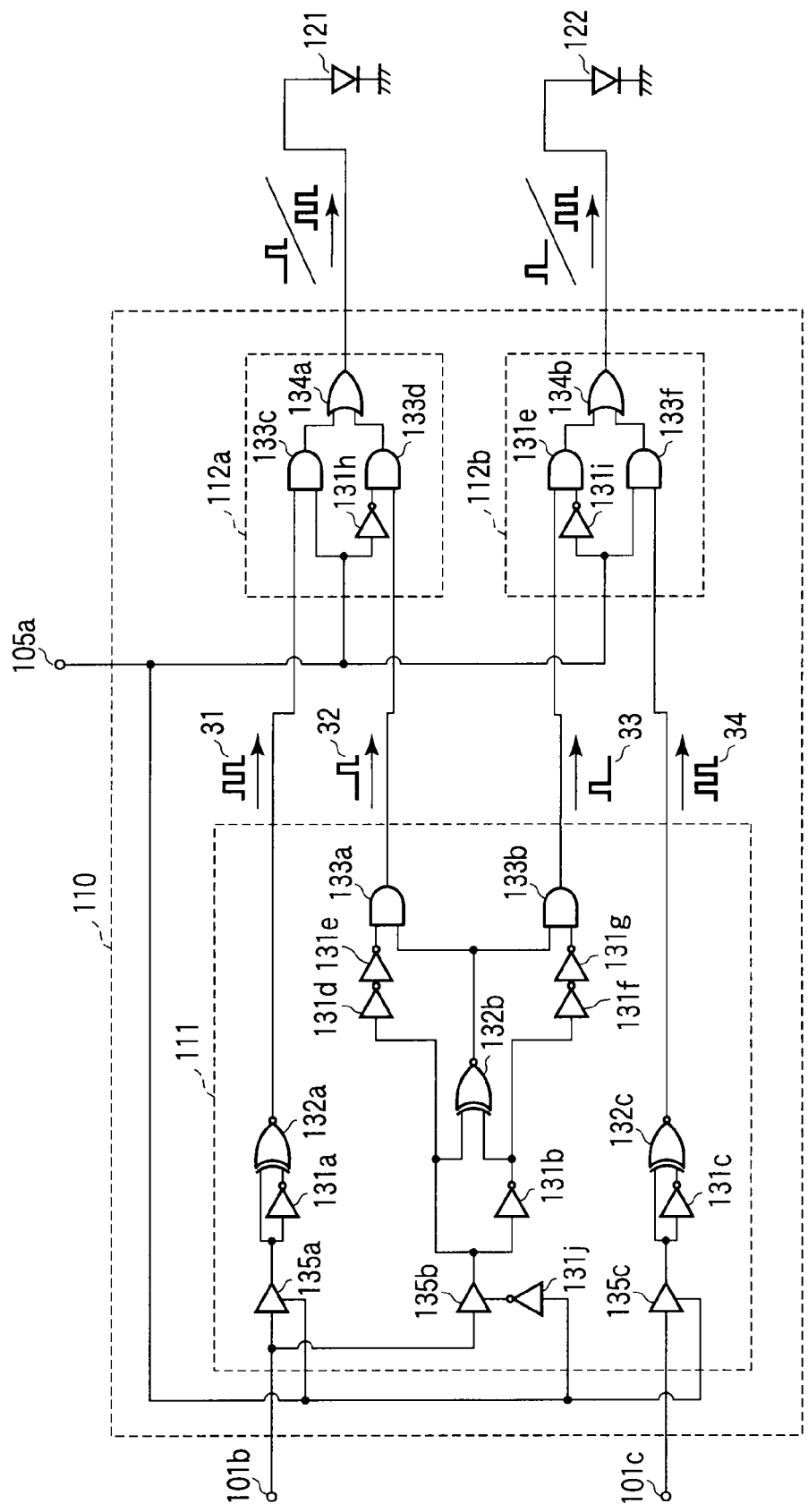
F I G. 10

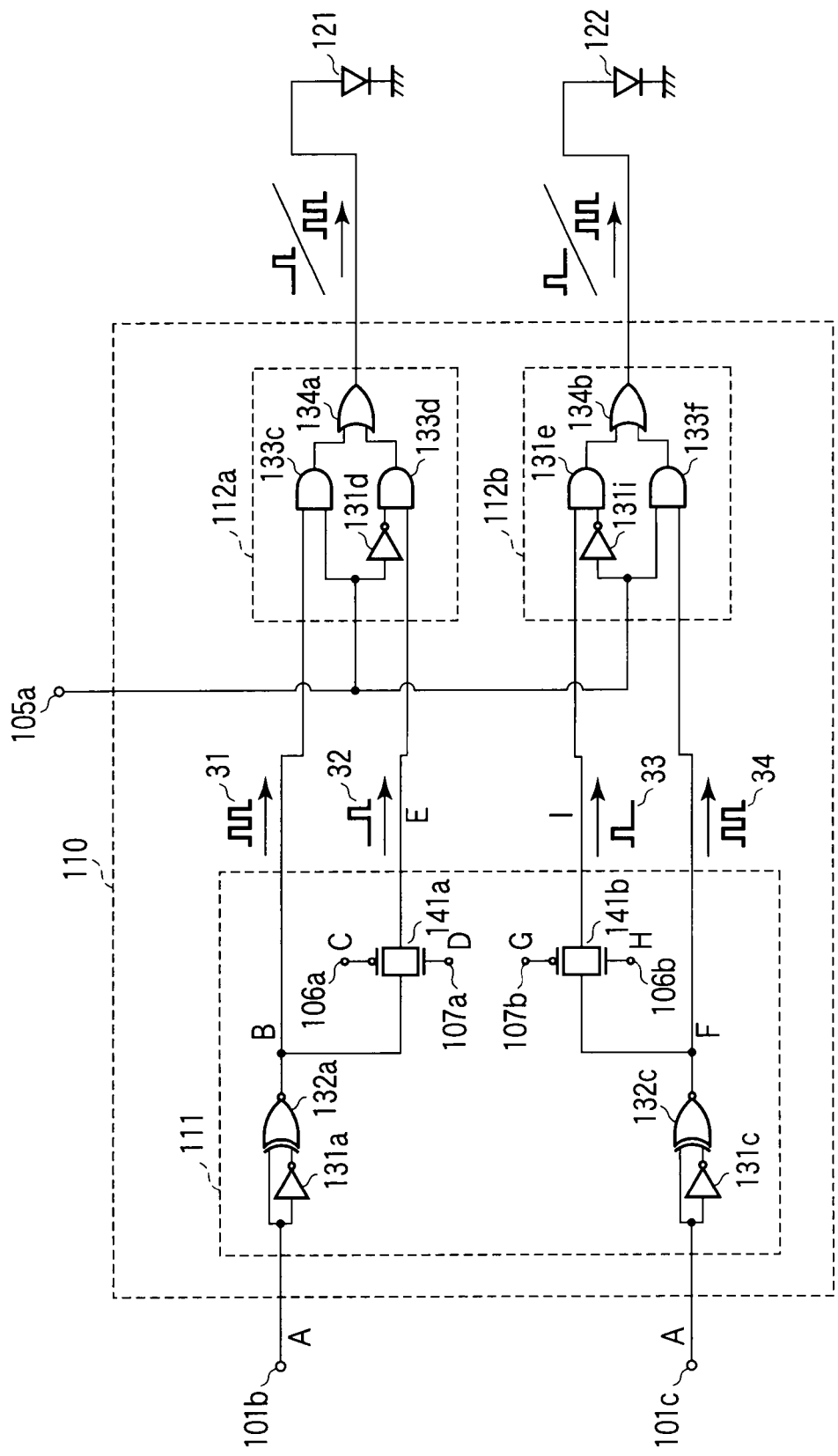
F I G. 11

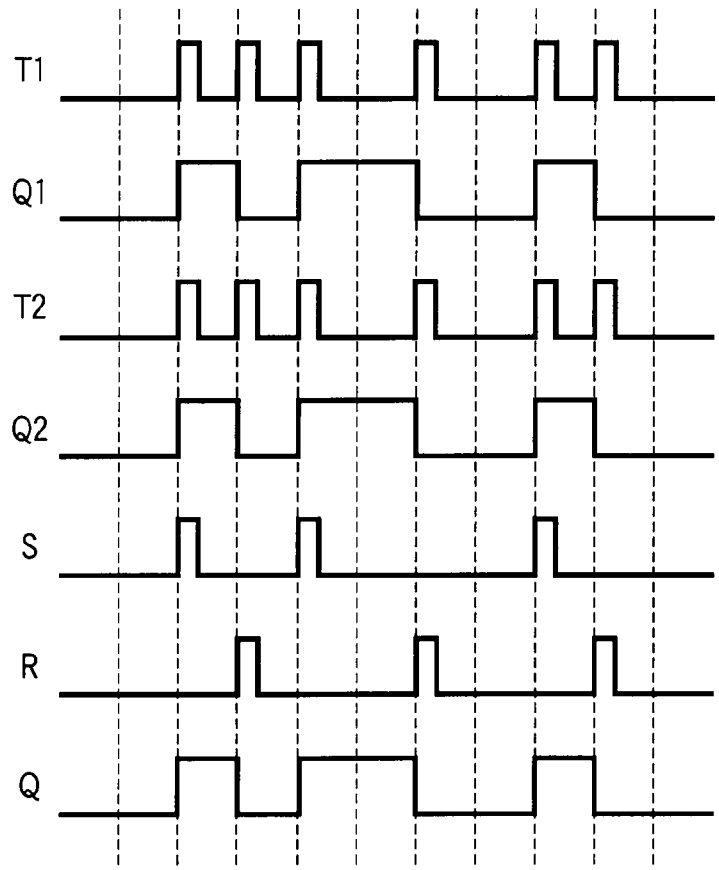
F I G. 16
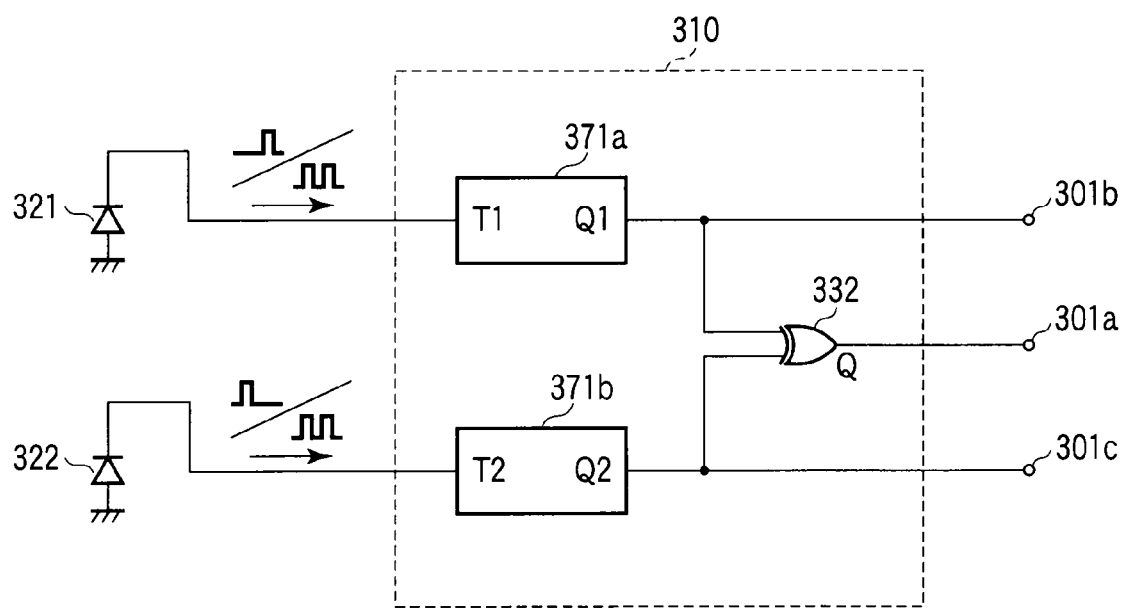
F I G. 17

COMPLEMENTARY OPTICAL WIRING APPARATUS

CROSS-REFERENCE TO RELATED APPLICATIONS

This application is based upon and claims the benefit of priority from prior Japanese Patent Application No. 2008-191022, filed Jul. 24, 2008, the entire contents of which are incorporated herein by reference.

BACKGROUND

Recently, much attention is paid to problems such as delay, loss and noise in signal transmission between LSI chips. Particularly, noise interference between various radio wave signals and in-circuit electrical signals becomes a problem in a mobile communication device such as a personal computer, mobile phone or the like. Under this condition, there is a growing tendency to use an optical signal that is free from electromagnetic noise, high in speed and low in loss for signal transmission between LSI chips.

Further, in the mobile device, a finite power source such as a battery is used. Therefore, it is strongly required that electronic parts in the device are low in power consumption. This also applies to a case wherein light is used as signal transmission means. A complementary optical wiring apparatus is proposed as an optical wiring apparatus with low power consumption in Document 1 (JP-A 2001-285195 (KOKAI)) and Document 2 (JP-A 2004-153442 (KOKAI)).

SUMMARY

According to a first aspect of this invention, there is provided a complementary optical wiring apparatus comprising an optical transmitter that generates two optical signals according to at least one of two digital electrical input signals, a first optical transmission line that transmits one of the optical signals, a second optical transmission line that transmits the other optical signal, and an optical receiver that generates a digital electrical output signal having the same digital information as the digital electrical input signal based on the two optical signals received via the first and second optical transmission lines, wherein the optical transmitter has a first operation mode of transmitting an optical signal synchronized with a rising edge of the one digital electrical input signal to the first optical transmission line and transmitting an optical signal synchronized with a falling edge of the one digital electrical input signal to the second optical transmission line, and a second operation mode of transmitting an optical signal synchronized with rising and falling edges of one of the two digital electrical input signals to the first optical transmission line and transmitting an optical signal that is synchronized with rising and falling edges of the other one of the two digital electrical input signals to the second optical transmission line, and is operated after one of the first and second operation modes is selected.

According to a second aspect of this invention, there is provided a complementary optical wiring apparatus comprising an optical transmitter that generates two optical signals according to at least one of two digital electrical input signals, a first optical transmission line that transmits one of the optical signals, a second optical transmission line that transmits the other optical signal, and an optical receiver that generates a digital electrical output signal having the same digital information as the digital electrical input signal based on the two optical signals received via the first and second optical transmission lines, wherein the optical transmitter has a first operation mode of transmitting an optical signal synchronized with a rising edge of the one digital electrical input signal to the first optical transmission line and transmitting an optical signal synchronized with a falling edge of the one digital electrical input signal to the second optical transmission line, and a second operation mode of transmitting an optical signal synchronized with rising and falling edges of one of the two digital electrical input signals to the first optical transmission line and transmitting an optical signal synchronized with rising and falling edges of the other one of the two digital electrical input signals to the second optical transmission line, and is operated after one of the first and second operation modes is selected, the optical receiver generates a digital electrical output signal having the same digital information as the one digital electrical input signal based on optical signals obtained via the first and second optical transmission lines in the first operation mode, and generates a digital electrical output signal having the same digital information as one of the two digital electrical input signals based on an optical signal obtained via the first optical transmission line and generates a digital electrical output signal having the same digital information as the other one of the two digital electrical input signals based on an optical signal obtained via the second optical transmission line in the second operation mode.

BRIEF DESCRIPTION OF THE SEVERAL VIEWS OF THE DRAWING

FIG. 1 is a diagram showing an example of the configuration of a complementary optical wiring apparatus according to a first embodiment.

FIGS. 2A and 2B are diagrams showing examples of the configuration of the complementary optical wiring apparatus according to the first embodiment in first and second operation modes, respectively.

FIGS. 3A and 3B are diagrams showing examples of the more specific configuration of the complementary optical wiring apparatus according to the first embodiment in the first and second operation modes, respectively.

FIG. 5 is a diagram showing an example of the specific circuit configuration of the optical transmitter of FIG. 4.

FIG. 10 is a diagram showing an example of the specific circuit configuration of the optical transmitter of FIG. 9.

FIG. 11 is a diagram showing another example of the specific circuit configuration of the optical transmitter of FIG. 9.

FIG. 16 is a timing chart showing schematic voltage waveforms in respective portions of the optical receiver of FIG. 15.

FIG. 17 is a diagram showing another example of the circuit configuration of the optical receiver of the complementary optical wiring apparatus according to the fourth embodiment.

DETAILED DESCRIPTION OF THE INVENTION

Figure 4:
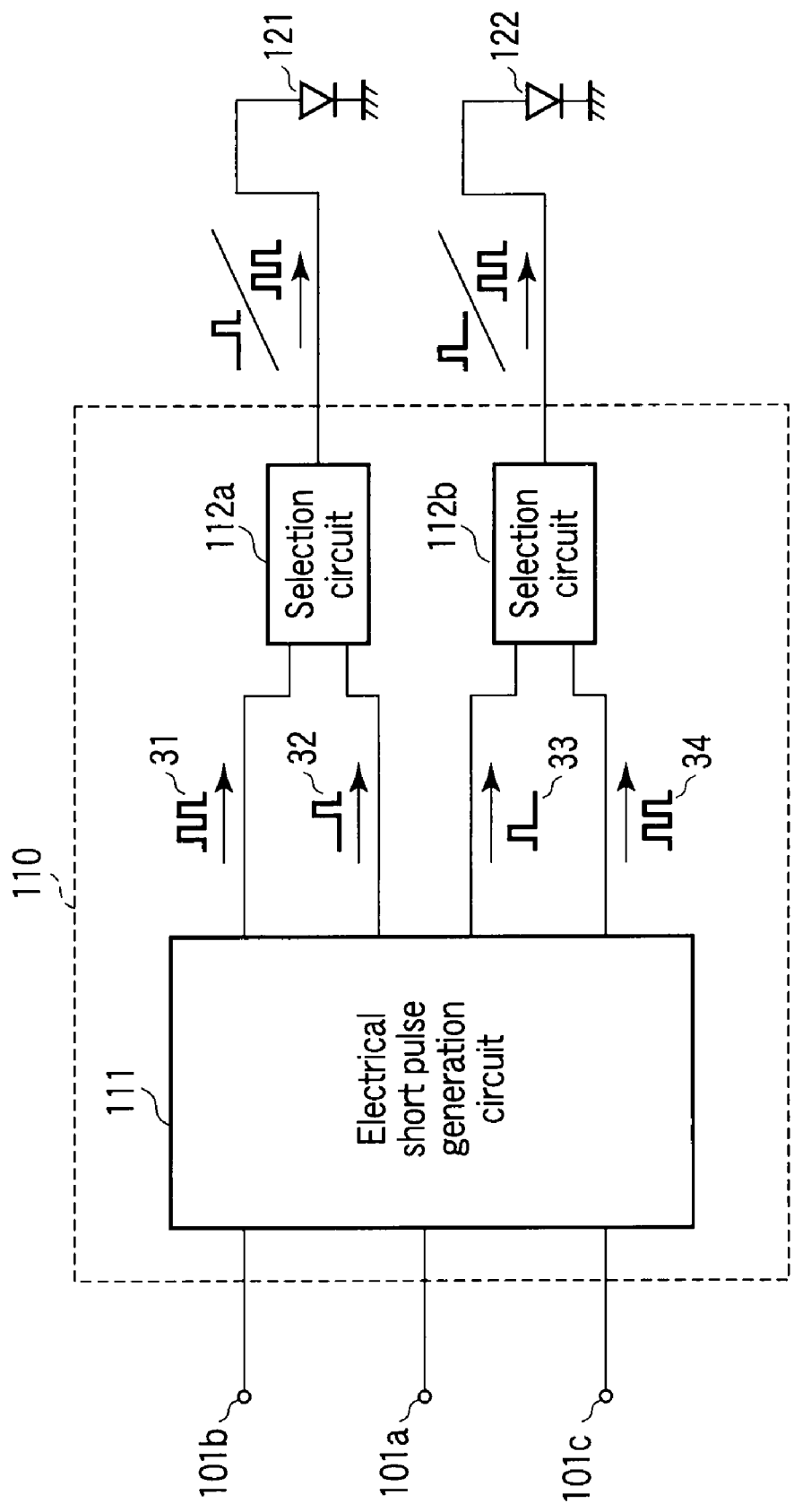
FIG. 4 is a diagram showing an example of the configuration of an optical transmitter of a complementary optical wiring apparatus according to a second embodiment.

First, a difference between methods conventionally proposed in Documents 1 and 2 as methods for transmitting optical signals and those of respective embodiments are simply explained.

In the apparatuses described in Documents 1 and 2, a light-emitting element is driven (activated to emit light) by using an electrical pulse signal (that can also be called an electrical short pulse signal) having a pulse width smaller than the minimum pulse width of a digital electrical input signal in synchronization with the signal transition of the digital electrical input signal.

In the apparatus of Document 1, two light-emitting elements are alternately activated to emit light by CR differential currents flowing in synchronization with the rising and falling edges of one digital electrical input signal. Then, optical signals generated by light emission are transmitted via two optical transmission lines to perform signal transmission. Further, in the apparatus of Document 2, one light-emitting element is activated to emit light by an electrical pulse signal generated in a digital form in synchronization with the rising and falling edges of one digital electrical input signal. Then, an optical signal generated by light emission is transmitted via one optical transmission line to perform signal transmission.

In the above conventional optical wiring apparatuses, optical power can be greatly reduced by signal transmission of only the rising and falling edges of the digital electrical input signal. However, in the apparatus of Document 1, since one electrical input signal is transmitted by use of two optical transmission lines, there occurs a problem that optical transmission lines of a number twice the number of signals are required to transmit a plurality of electrical input signals.

Further, in the apparatus of Document 2, since one electrical input signal is transmitted by use of one optical transmission line, it is possible to configure the apparatus by use of a small number of optical transmission lines even when a plurality of electrical input signals are transmitted. However, the apparatus is configured to generate a digital electrical output signal having the same digital information ("0", "1") as the digital electrical input signal by counting the number of transmitted optical pulses on the receiving side. Therefore, if even one of the optical pulses fails to be received due to the influence of noise, for example, the logic of the digital electrical output signal generated may be inverted. That is, there occurs a problem that the reliability of signal transmission is low.

In the embodiments of this invention described below, parallel signal transmission and serial signal transmission are realized without changing the system configuration according to the number of signal transmission lines, the reliability required for signal transmission and high signal transmission speed. Serial signal transmission in this invention is a method for transmitting one digital electrical input signal by use of two optical transmission lines. Parallel signal transmission in this invention is a method for transmitting two digital electrical input signals by use of two optical transmission lines. For example, serial signal transmission is used when highly reliable signal transmission is desired. On the other hand, parallel signal transmission is used when less number of optical signal transmission lines is desired. Thus, the transmission methods can be flexibly selected according to important consideration in the signal transmission scheme.

Several embodiments of this invention will be described below with reference to the accompanying drawings. In the following description of the drawings, the same or similar portions are denoted by the same or similar symbols. It should be particularly noted that circuits described in the drawings are shown only as an example. For example, the technical concept of this invention is not specified by the types, numbers and connection forms of individual circuit elements. That is, the technical concept of this invention can be variously changed without departing from the scope of this invention.

First Embodiment

FIG. 1 is a diagram showing an example of the configuration of a complementary optical wiring apparatus according to a first embodiment of this invention.

The apparatus includes an optical transmitter 100 that generates optical signals 21 in synchronization with the rising and falling edges of a digital electrical input signal, first and second optical transmission lines 201, 202 that transmit the optical signals 21 and an optical receiver 300 that generates a digital electrical output signal having the same digital information as the digital electrical input signal based on the optical signals 21 acquired via the first and second optical transmission lines 201, 202.

For example, the optical transmitter 100 and optical receiver 300 are provided on different boards. The optical transmitter 100 and optical receiver 300 are connected via the first and second optical transmission lines 201, 202 so that they can be used for signal transmission between LSI chips of the different boards. However, they are not necessarily provided on different boards and the optical transmitter 100, optical transmission lines 201, 202 and optical receiver 300 can be provided on the same board.

The optical transmitter 100 has first and second operation modes and can be operated after one of the two operation modes is selected. In the first operation mode, an optical signal that is synchronized with the rising edge of one digital electrical input signal is transmitted via the first optical transmission line 201 and an optical signal that is synchronized with the falling edge of the digital electrical input signal is transmitted via the second optical transmission line 202. In the second operation mode, an optical signal that is synchronized with the rising and falling edges of one of two digital electrical input signals is transmitted via the first optical transmission line 201 and an optical signal that is synchronized with the rising and falling edges of the other one of the two digital electrical input signals is transmitted via the second optical transmission line 202.

The configuration example of the complementary optical wiring apparatus of this embodiment is separately shown in the first and second operation modes. FIG. 2A corresponds to a case of the first operation mode and FIG. 2B corresponds to a case of the second operation mode.

In FIGS. 2A, 2B, a symbol 11a indicates only one transmitting side digital electrical input signal (a single digital electrical input signal in the first operation mode) that is input to the optical transmitter 100, 11b indicates one (a first digital electrical input signal in the second operation mode) of two transmitting side digital electrical input signals that are input to the optical transmitter 100, and 11c indicates the other one (a second digital electrical input signal in the second operation mode) of the two transmitting side digital electrical input signals that are input to the optical transmitter 100.

Further, a symbol 12a indicates a receiving side digital electrical output signal (a single digital electrical output signal in the first operation mode) having the same digital information as the digital electrical input signal 11a, 12b indicates a receiving side digital electrical output signal (a first digital electrical output signal in the second operation mode) having the same digital information as the digital electrical input signal 11b, and 12c indicates a receiving side digital electrical output signal (a second digital electrical output signal in the second operation mode) having the same digital information as the digital electrical input signal 11c. Further, a symbol 21a indicates an optical signal that is synchronized with the rising edge of the digital electrical input signal 11a, 21b indicates an optical signal that is synchronized with the falling edge of the signal 11a, a symbol 21c indicates an optical signal that is synchronized with the rising and falling edges of the digital electrical input signal 11b, and 21d indicates an optical signal that is synchronized with the rising and falling edges of the signal 11c.

The optical transmitter 100 generates optical signals 21a to 21d that are synchronized with the rising and falling edges of the digital electrical input signals 11a to 11c input thereto. The optical receiver 300 generates digital electrical output signals 12a to 12c in response to the optical signals 21a to 21d.

That is, in the first operation mode of FIG. 2A, the optical signal 21a that is synchronized with the rising edge of the digital electrical input signal 11a is transmitted via the first optical transmission line 201, and the optical signal 21b that is synchronized with the falling edge of the signal 11a is transmitted via the second optical transmission line 202. Further, in the second operation mode of FIG. 2B, the optical signal 21c that is synchronized with the rising and falling edges of the digital electrical input signal 11b is transmitted via the first optical transmission line 201, and the optical signal 21d that is synchronized with the rising and falling edges of the digital electrical input signal 11c is transmitted via the second optical transmission line 202.

In the complementary optical wiring apparatus shown in FIG. 1, the first operation mode shown in FIG. 2A and the second operation mode shown in FIG. 2B can be dynamically switched without modifying the configuration of the apparatus. The switching method can be attained by switching the modes based on automatic determination according to an input signal in the optical transmitter 100 and optical receiver 300 or by switching the modes according to a control signal that is separately supplied. Thus, for example, a low-speed signal can be transmitted with high reliability in the first operation mode (serial signal transmission) shown in FIG. 2A and high-speed signals can be transmitted with the electrical circuit load alleviated in the second operation mode (parallel signal transmission) shown in FIG. 2B.

The configuration examples of the complementary optical wiring apparatus showing the details of the optical transmitter 100 and optical receiver 300 in FIGS. 2A and 2B are shown in FIGS. 3A and 3B. FIG. 3A shows a first operation mode and FIG. 3B shows a second operation mode. A symbol 121 in FIGS. 3A and 3B indicates a first light-emitting element, 122 a second light-emitting element and 110 a transmitting circuit. Further, a symbol 321 indicates a first light-receiving element, 322 a second light-receiving element and 310 a receiving circuit.

In the transmitting circuit 110, an electrical pulse signal with a pulse width smaller than the minimum pulse width of a digital electrical input signal is generated in synchronization with the rising and falling edges of the digital electrical input signal so as to activate the first and second light-emitting elements 121, 122 to emit light according to the first and second operation modes. Then, in the first operation mode shown in FIG. 3A, the first light-emitting element 121 is activated to emit light in response to an electrical pulse signal that is synchronized with the rising edge of the digital electrical input signal 11a and the second light-emitting element 122 is activated to emit light in response to an electrical pulse signal that is synchronized with the falling edge of the signal 11a.

Further, in the second operation mode shown in FIG. 3B, the first light-emitting element 121 is activated to emit light in response to an electrical pulse signal that is synchronized with the rising and falling edges of the digital electrical input signal 11b. Also, the second light-emitting element 122 is activated to emit light in response to an electrical pulse signal that is synchronized with the rising and falling edges of the digital electrical input signal 11c.

In the receiving circuit 310, a digital electrical output signal is generated according to a received electrical pulse signal (that is hereinafter referred to as a first received electrical pulse signal) generated from the first light-receiving element 321 that has received light and a received electrical pulse signal (that is hereinafter referred to as a second received electrical pulse signal) generated from the second light-receiving element 322 that has received light. Then, in the first operation mode shown in FIG. 3A, a digital electrical output signal 12a having the same digital information as the digital electrical input signal 11a is generated according to an optical signal 21a that is synchronized with the rising edge of the signal 11a and an optical signal 21b that is synchronized with the falling edge of the signal 11a.

Further, in the second operation mode shown in FIG. 3B, a digital electrical output signal 12b having the same digital information as the digital electrical input signal 11b is generated according to an optical signal 21c that is synchronized with the rising and falling edges of the signal 11b. Also, a digital electrical output signal 12c having the same digital information as the digital electrical input signal 11c is generated according to an optical signal 21d that is synchronized with the rising and falling edges of the signal 11c.

Thus, according to this embodiment, signal transmission with high reliability can be performed in the first operation mode (serial transmission mode) shown in FIG. 2A and signal transmission with less number of optical transmission lines can be performed in the second operation mode (parallel transmission mode) shown in FIG. 2B. Therefore, a complementary optical wiring apparatus in which the signal transmission method can be flexibly selected according to important consideration of the signal transmission scheme can be realized and an electronic apparatus with low power consumption, high performance and high reliability can be attained.

In the configuration examples of the complementary optical wiring apparatus shown in FIGS. 3A, 3B, the anodes of the first and second diode type light-emitting elements 121, 122 are connected to the transmitting circuit 110 and the cathodes thereof are grounded. However, the configuration in which the cathodes are connected to the transmitting circuit 110 and the anodes are connected to a power source can be made. Further, the cathodes of the first and second diode type light-receiving elements 321, 322 are connected to the receiving circuit 310 and the anodes thereof are grounded. However, the configuration in which the anodes are connected to the receiving circuit 310 and the cathodes are connected to a power source can be made. The same applies to the following embodiments.

Second Embodiment

An example of the configuration of a complementary optical wiring apparatus according to a second embodiment of this invention is shown in FIG. 4. FIG. 4 shows the transmitting circuit 110 shown in FIGS. 3A, 3B in detail.

In FIG. 4, a symbol 101a indicates an input terminal of a digital electrical input signal 11a, 101b an input terminal of a digital electrical input signal 11b, 101c an input terminal of a digital electrical input signal 11c, and 111 an electrical short pulse generation circuit. Further, a symbol 31 indicates an electrical pulse signal (third electrical pulse signal) corresponding to the rising and falling (synchronized with the rising and falling edges) of the signal 11b, 32 an electrical pulse signal (first electrical pulse signal) corresponding to the rising (synchronized with the rising edge) of the signal 11a, 33 an electrical pulse signal (second electrical pulse signal) corresponding to the falling (synchronized with the falling edge) of the signal 11a, 34 an electrical pulse signal (fourth electrical pulse signal) corresponding to the rising and falling (synchronized with the rising and falling edges) of the signal 11c, 112a a first selection circuit and 112b a second selection circuit.

The electrical short pulse generation circuit 111 generates electrical pulse signals in response to digital electrical input signals and has three input terminals. In the first operation mode, a digital electrical input signal 11a is input to the input terminal 101a. In the second operation mode, a digital electrical input signal 11b is input to the input terminal 101b and a digital electrical input signal 11c is input to the input terminal 101c. An electric circuit such as a serializer arranged in the preceding stage of the transmitting side of the complementary optical wiring apparatus shown in FIG. 4 may be configured to appropriately switch an output according to the first and second operation modes.

The first selection circuit 112a can select and output one of the electrical pulse signals 31 and 32. It outputs the electrical pulse signal 32 corresponding to the rising of the digital electrical input signal 11a in the first operation mode. Further, it outputs the electrical pulse signal 31 corresponding to the rising and falling of the digital electrical input signal 11b in the second operation mode.

The second selection circuit 112b can select and output one of the electrical pulse signals 33 and 34. It outputs the electrical pulse signal 33 corresponding to the falling of the digital electrical input signal 11a in the first operation mode. Further, it outputs the electrical pulse signal 34 corresponding to the rising and falling of the digital electrical input signal 11c in the second operation mode. With the above configuration, it is possible to selectively switch optical signals generated from the light-emitting elements 121, 122 according to the first and second operation modes.

Figure 6:
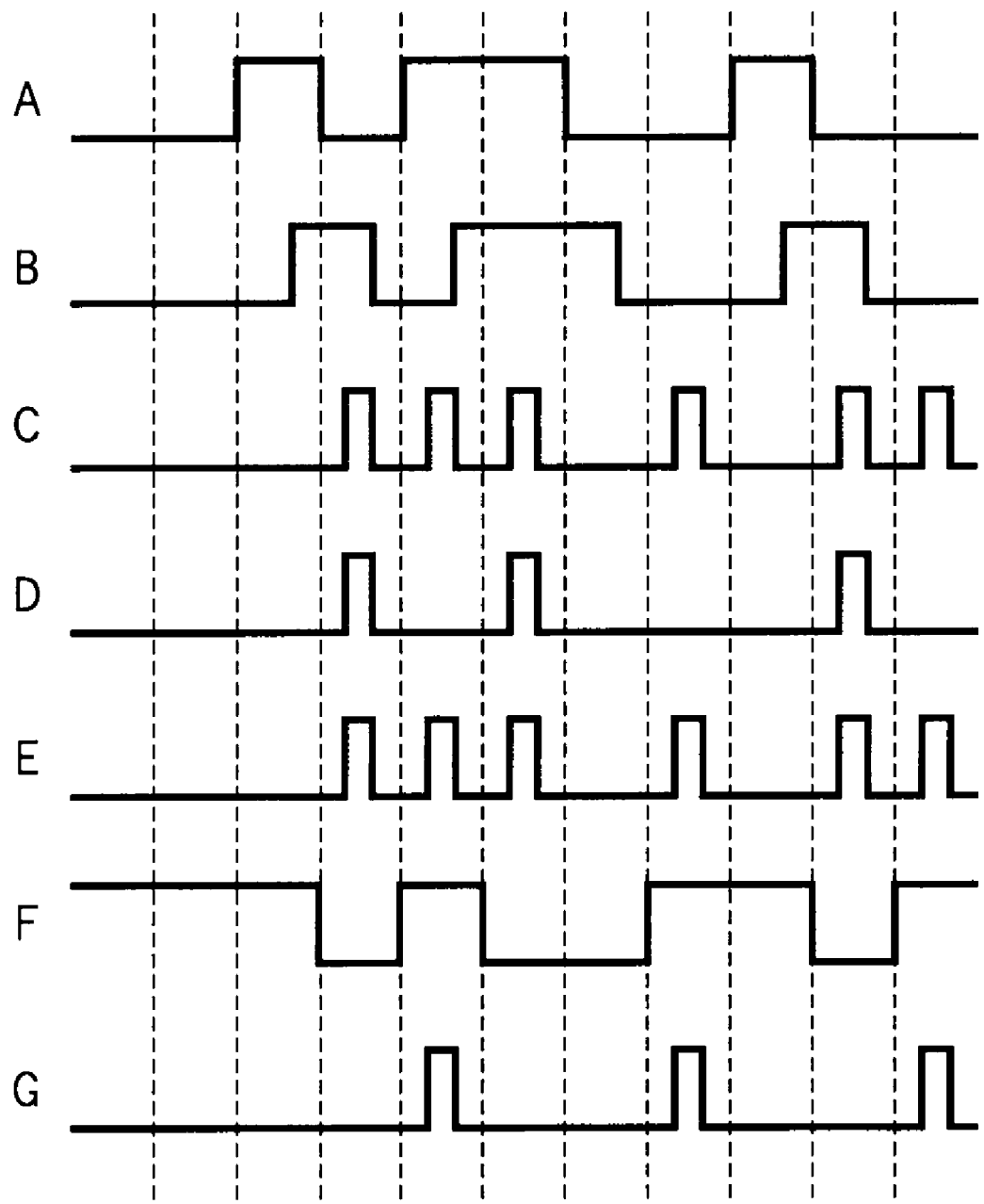
FIG. 6 is a timing chart showing schematic voltage waveforms in respective portions of the optical transmitter of FIG. 4.

An example of the specific circuit configuration of an optical transmitter shown in FIG. 4 is shown in FIG. 5. In FIG. 5, 131a to 131i indicate inverter circuits, 132a to 132c XNOR circuits, 133a to 133f AND circuits, 134a, 134b OR circuits, and 105a a control terminal used to input a control signal that switches the first and second operation modes. FIG. 6 is a timing chart showing schematic voltage waveforms in respective portions A to G of FIG. 5.

In the electrical short pulse generation circuit 111 of FIG. 5, an electrical pulse signal (C and E in FIG. 6) corresponding to the rising and falling of the digital electrical input signal 11a is generated by means of the XNOR circuit 132b according to the signal 11a (A in FIG. 6) input to the input terminal 101a and an electrical pulse obtained by inverting and delaying the signal 11a by means of the inverter circuit 131b in the first operation mode.

Then, an electrical pulse signal 32 (D in FIG. 6) corresponding to the rising of the digital electrical input signal 11a is generated according to an electrical pulse signal (C in FIG. 6) corresponding to the rising and falling of the signal 11a and an electrical pulse (B in FIG. 6) obtained by delaying the signal 11a by means of the AND circuit 133a. Further, an electrical pulse signal 33 (G in FIG. 6) corresponding to the falling of the digital electrical input signal 11a is generated according to an electrical pulse signal (E in FIG. 6) corresponding to the rising and falling of the signal 11a and an electrical pulse (F in FIG. 6) obtained by inverting and delaying the signal 11a by means of the AND circuit 133b.

On the other hand, in the second operation mode, an electrical pulse signal 31 corresponding to the rising and falling of the digital electrical input signal 11b input to the input terminal 101b is generated by means of the XMOR circuit 132a and an electrical pulse signal 34 corresponding to the rising and falling of the digital electrical input signal 11c input to the input terminal 101c is generated.

In the first selection circuit 112a of FIG. 5, "0" is input to the control terminal 105a in the first operation mode and only the AND circuit 133d among the AND circuits 133c, 133d is set into the operation mode. At this time, the electrical pulse signal 32 corresponding to the rising of the digital electrical input signal 11a is output from the OR circuit 134a. Further, "1" is input to the control terminal 105a in the second operation mode and only the AND circuit 133c among the AND circuits 133c, 133d is set into the operation mode. At this time, the electrical pulse signal 31 corresponding to the rising and falling of the digital electrical input signal 11b is output from the OR circuit 134a.

On the other hand, in the second selection circuit 112b of FIG. 5, "0" is input to the control terminal 105a in the first operation mode and only the AND circuit 133e among the AND circuits 133e, 133f is set into the operation mode. At this time, the electrical pulse signal 33 corresponding to the falling of the digital electrical input signal 11a is output from the OR circuit 134b. Further, "1" is input to the control terminal 105a in the second operation mode and only the AND circuit 133f among the AND circuits 133e, 133f is set into the operation mode. At this time, the electrical pulse signal 34 corresponding to the rising and falling of the digital electrical input signal 11c is output from the OR circuit 134b.

Thus, on the transmitting side of the complementary optical wiring apparatus shown in FIG. 5, the electrical short pulse generation circuit 111 generates an electrical pulse signal in response to an output of the electric circuit such as a serializer arranged in the preceding stage of the transmitting side of the complementary optical wiring apparatus and, at the same time, it can be operated by switching the operations of the first and second selection circuits 112a, 112b according to a control signal input to the control terminal 105a to dynamically switch the first and second operation modes.

Figure 7:
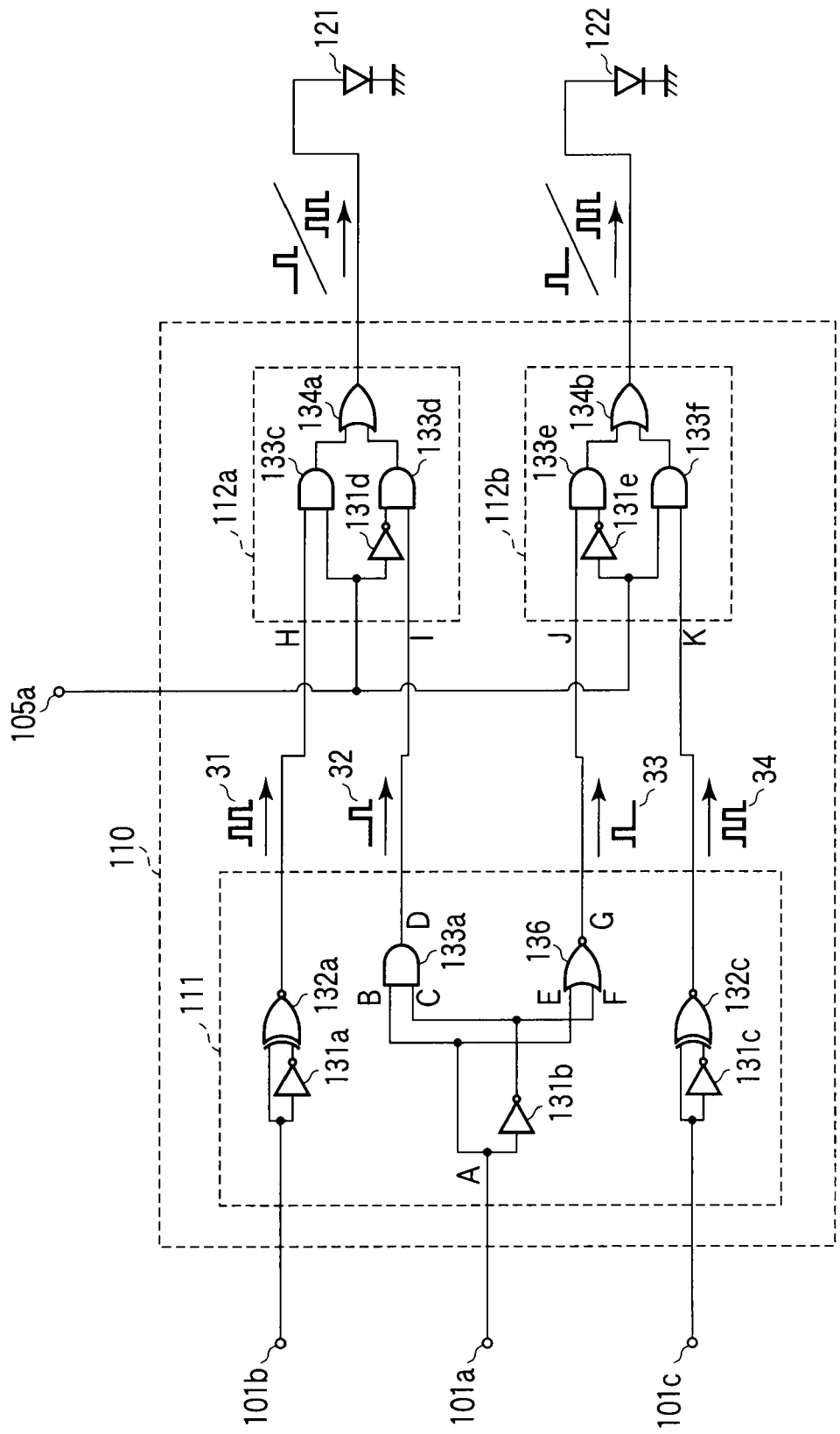
FIG. 7 is a diagram showing another example of the specific circuit configuration of the optical transmitter of FIG. 4.
Figure 8:
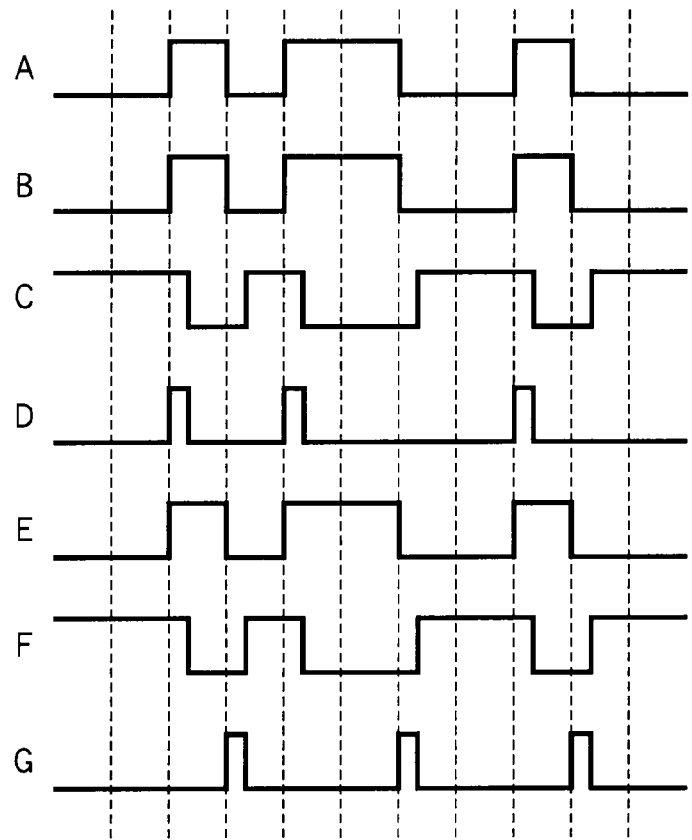
FIG. 8 is a timing chart showing schematic voltage waveforms in respective portions of the optical transmitter of FIG. 7.

Another example of the specific circuit configuration of the optical transmitter of FIG. 4 is shown in FIG. 7. In FIG. 7, a symbol 136 indicates a NOR circuit and the logic circuits that are different from the above NOR circuit and are the same as those of FIG. 5 are denoted by the same reference symbols. FIG. 8 is a timing chart showing schematic voltage waveforms in respective portions A to G of FIG. 7. Delays of the respective circuits are taken into consideration in the case of FIG. 6, but delays of the respective circuits are neglected in the case of FIG. 8.

In an optical transmitter shown in FIG. 7, a circuit that generates electrical pulse signals 32, 33 according to the digital electrical input signal 11a is different from the optical transmitter shown in FIG. 5. That is, an electrical pulse signal 32 (D in FIG. 8) corresponding to the rising of the digital electrical input signal 11a input to the input terminal 101a is generated by means of the AND circuit 133a according to the signal 11a (A, B and E in FIG. 8) and an electrical pulse (C and F in FIG. 8) obtained by inverting and delaying the signal 11a by means of the inverter circuit 131b. Further, an electrical pulse signal 33 (G in FIG. 8) corresponding to the falling of the signal 11a is generated by means of the NOR circuit 136.

Thus, in this embodiment, the optical transmitter 100 of the complementary optical wiring apparatus, particularly, the transmitting circuit 110 can be realized only by use of logic elements and the complementary optical wiring apparatus can be realized with a simplified configuration. In this case, the circuit configuration for realizing the transmitting circuit 110 is not limited to a specified configuration such as the examples explained in FIGS. 5 and 7, for example, and can be adequately modified.

Third Embodiment

Figure 9:
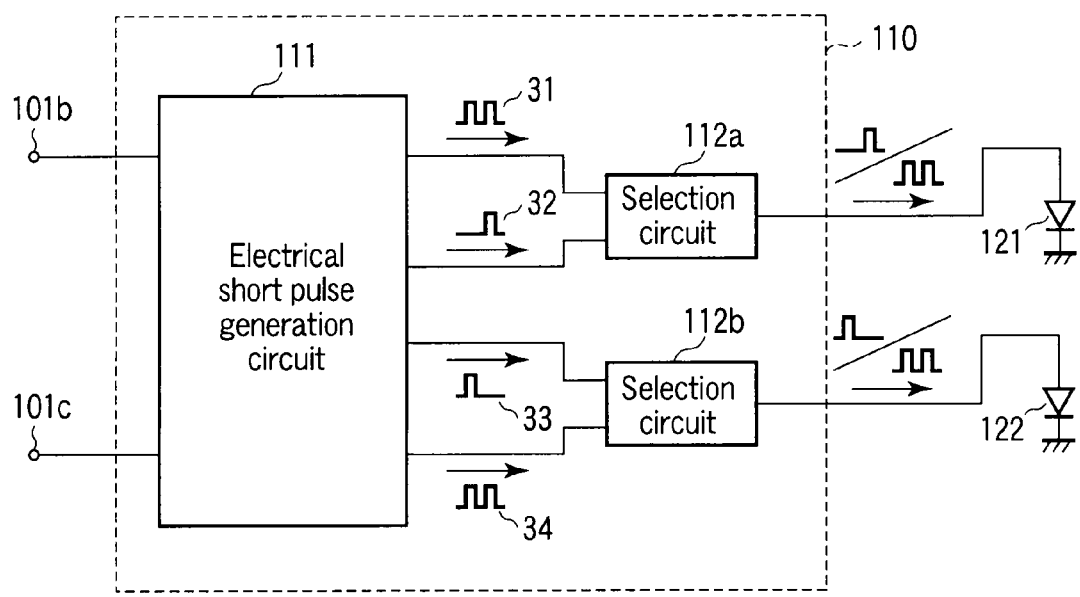
FIG. 9 is a diagram showing an example of the configuration of an optical transmitter of a complementary optical wiring apparatus according to a third embodiment.

An example of the configuration that is different from the configuration example on the transmitting side of the complementary optical wiring apparatus according to the second embodiment shown in FIG. 4 is shown in FIG. 9 as a third embodiment of this invention.

In FIG. 9, input terminals of digital electrical input signals include only two input terminals 101b and 101c.

In the first operation mode, a digital electrical input signal 11a may be input only to the input terminal 101b, only to the input terminal 101c or to both of the input terminals 101b, 101c. In the second operation mode, a digital electrical input signal 11b is input to the input terminal 101b and a digital electrical input signal 11c is input to the input terminal 101c.

An electric circuit such as a serializer arranged in the preceding stage of the transmitting side of the complementary optical wiring apparatus shown in FIG. 9 can be configured to appropriately switch an output according to the first and second operation modes.

An example of the specific circuit configuration of the optical transmitter of FIG. 9 is shown in FIG. 10. Symbols 135a to 135c indicate tri-state buffers that function as buffers when control terminal inputs thereof are set at "1" (that is, inputs are output as they are) and are set into high-impedance states when the control terminal inputs thereof are set at "0" (that is, inputs are not transmitted to the output side). A symbol 131j indicates an inverter circuit. The configuration of the latter stage with respect to the tri-state buffers 135a to 135c is the same as that of FIG. 5.

In the transmitting circuit 110 of FIG. 10, a digital electrical input signal 11a is input to the input terminal 101b and "0" is input to the control terminal 105a in the first operation mode. At this time, the tri-state buffers 135a, 135c are set into the high-impedance state and do not output signals. Further, since "1" is input to the control terminal of the tri-state buffer 135b via the inverter circuit 131j, the tri-state buffer 135b outputs an input signal as it is. Next, an electrical pulse signal 32 corresponding to the rising of the signal 11a and an electrical pulse signal 33 corresponding to the falling of the signal 11a are generated by the latter stage circuit of the tri-state buffer 135b. Since "0" is input to the control terminal 105a, the electrical pulse signal 32 corresponding to the rising of the signal 11a and the electrical pulse signal 33 corresponding to the falling of the signal 11a are selectively output in the first and second selection circuits 112a, 112b.

On the other hand, in the second operation mode, digital electrical input signals 11b, 11c are respectively input to the input terminals 101b, 101c and "1" is input to the control terminal 105a. At this time, the tri-state buffers 135a, 135c output input signals as they are. However, the tri-state buffer 135b is set into the high-impedance state and does not output a signal since "0" is input to the control terminal of the tri-state buffer 135b via the inverter circuit 131j. Next, an electrical pulse signal 31 corresponding to the rising and falling of the signal 11b and an electrical pulse signal 34 corresponding to the rising and falling of the signal 11c are generated by the latter stage circuits of the tri-state buffers 135a, 135c. Since "1" is input to the control terminal 105a, the electrical pulse signal 31 corresponding to the rising and falling of the signal 11b and the electrical pulse signal 34 corresponding to the rising and falling of the signal 11c are selectively output in the first and second selection circuits 112a, 112b.

Figure 12:
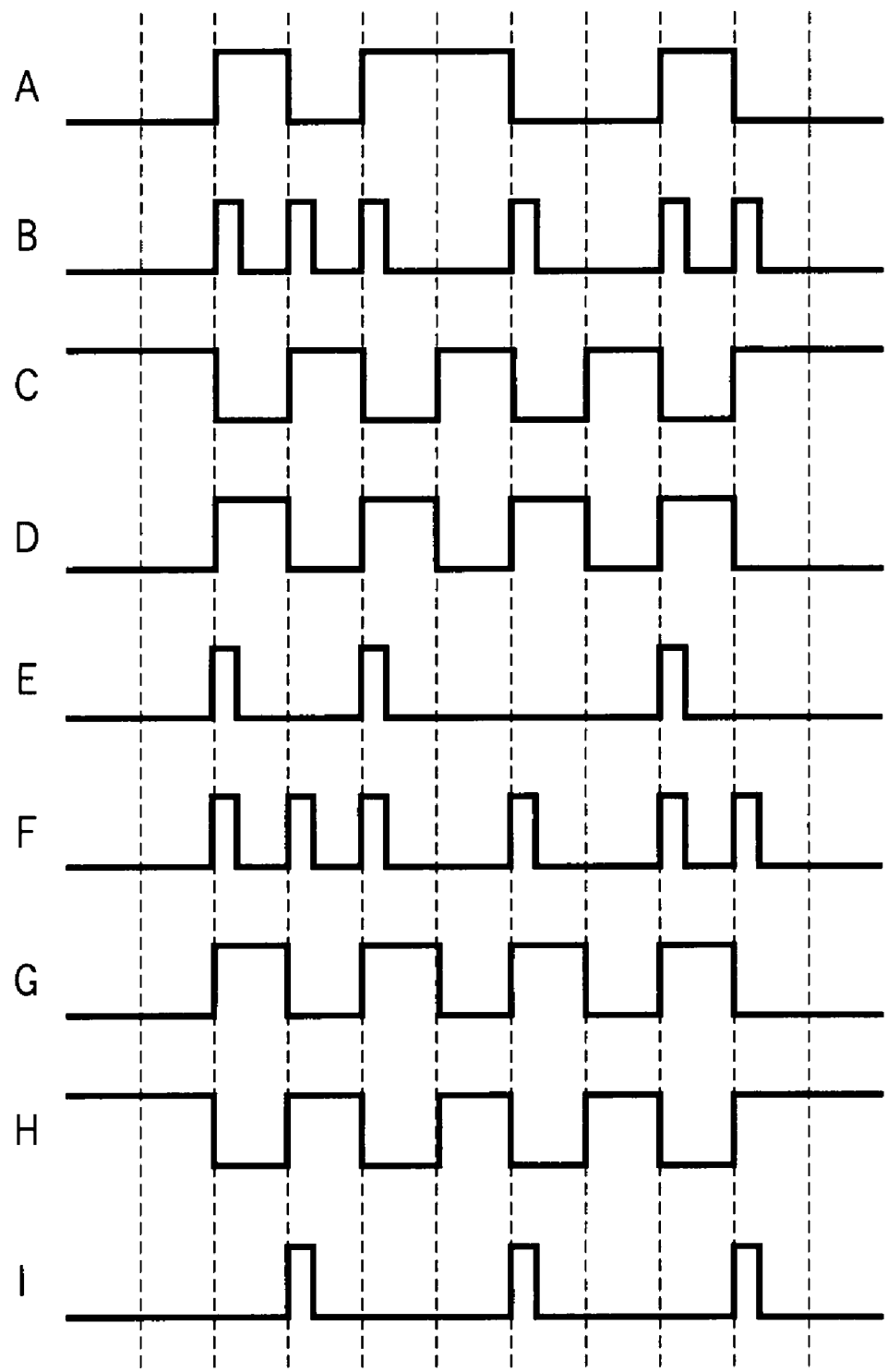
FIG. 12 is a timing chart showing schematic voltage waveforms in respective portions of the optical transmitter of FIG. 11.

Another example of the specific circuit configuration of the optical transmitter of FIG. 9 is shown in FIG. 11. This is different from the example shown in FIG. 10 in the configuration of the electrical short pulse generation circuit 111. In FIG. 11, symbols 141a, 141b indicate complementary pass-gates, 106a, 106b negative-logic half-clock input terminals and 107a, 107b positive-logic half-clock input terminals. In this case, the half clock is a clock having a period twice the minimum bit width of a digital electrical input signal. FIG. 12 is a timing chart showing schematic voltage waveforms in respective portions A to I of FIG. 11.

In the electrical short pulse generation circuit 111 of FIG. 11, an electrical pulse signal (B in FIG. 12) corresponding to the rising and falling of a digital electrical input signal is generated according to the digital electrical input signal (A in FIG. 12) input to the input terminal 101b. After this, the electrical pulse signal is divided into two paths. One of the divided signal components is output as it is as an electrical pulse signal 31. The other signal component is output as an electrical pulse signal 32 (E in FIG. 12) corresponding to the rising of the digital electrical input signal by the complementary pass-gate 141*a* that performs a gating operation by use of a negative-logic half clock (C in FIG. 12) and positive-logic half clock (D in FIG. 12).

An electrical pulse signal (F in FIG. 12) corresponding to the rising and falling of a digital electrical input signal is generated according to the digital electrical input signal (A in FIG. 12) input to the input terminal 101*c*. After this, the electrical pulse signal is divided into two paths. One of the divided signal components is output as it is as an electrical pulse signal 34. The other signal component is output as an electrical pulse signal 33 (I in FIG. 12) corresponding to the falling of the digital electrical input signal by the complementary pass-gate 141*b* that performs a gating operation by use of a positive-logic half clock (G in FIG. 12) and negative-logic half clock (H in FIG. 12).

In the transmitting circuit 110 of FIG. 11, a digital electrical input signal 11*a* is input to both of the input terminals 101*b*, 101*c* and "0" is input to the control terminal 105*a* in the first operation mode. At this time, an electrical pulse signal 32 corresponding to the rising of the signal 11*a* and an electrical pulse signal 33 corresponding to the falling of the signal 11*a* are selectively output by the first and second selection circuits 112*a*, 112*b*. On the other hand, in the second operation mode, digital electrical input signals 11*b*, 11*c* are respectively input to the input terminals 101*b*, 101*c* and "1" is input to the control terminal 105*a*. At this time, an electrical pulse signal 31 corresponding to the rising and falling of the signal 11*b* and an electrical pulse signal 34 corresponding to the rising and falling of the signal 11*c* are selectively output by the first and second selection circuits 112*a*, 112*b*.

Figure 13:
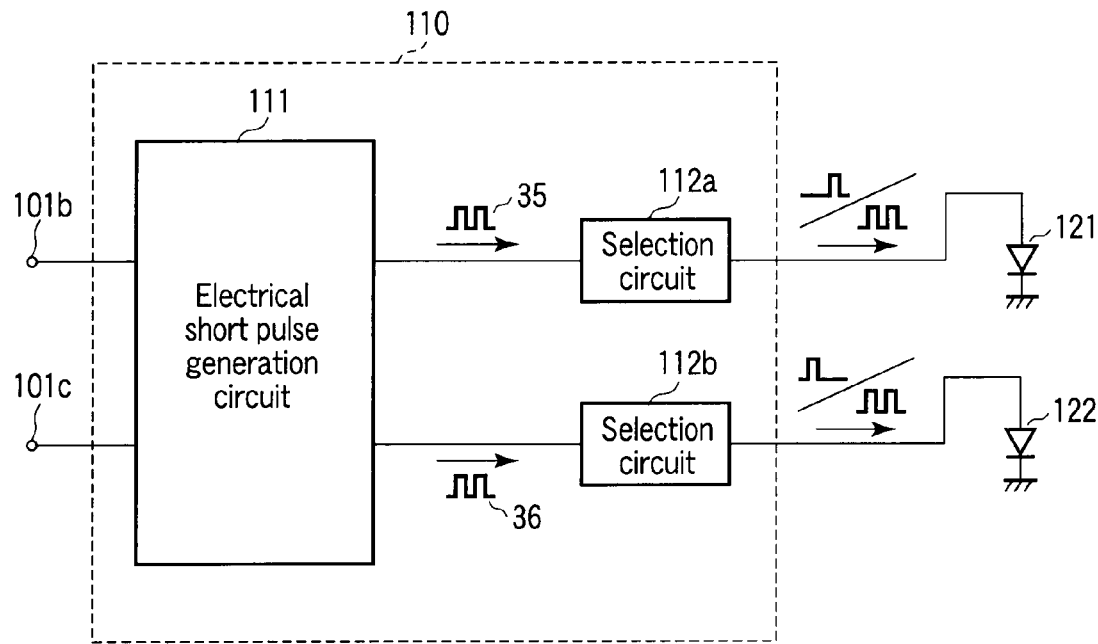
FIG. 13 is a diagram showing another example of the configuration of the optical transmitter of the complementary optical wiring apparatus according to the third embodiment.

An example of the configuration different from the configurations of the optical transmitters of FIGS. 9, 10 is shown in FIG. 13. In FIG. 13, a symbol 35 indicates an electrical pulse signal (first auxiliary electrical pulse signal) corresponding to the rising and falling of a digital electrical input signal input to the input terminal 101*b* and 36 indicates an electrical pulse signal (second auxiliary electrical pulse signal) corresponding to the rising and falling of a digital electrical input signal input to the input terminal 101*c*. Thus, the electrical short pulse generation circuit 111 of FIG. 13 outputs only two electrical pulse signals.

The first selection circuit 112*a* of FIG. 13 selectively outputs only the rising edge of an electrical pulse signal 35 in the first operation mode and outputs the electrical pulse signal 35 as it is in the second operation mode. The second selection circuit 112*b* selectively outputs only the falling edge of an electrical pulse signal 36 in the first operation mode and outputs the electrical pulse signal 36 as it is in the second operation mode.

Figure 14:
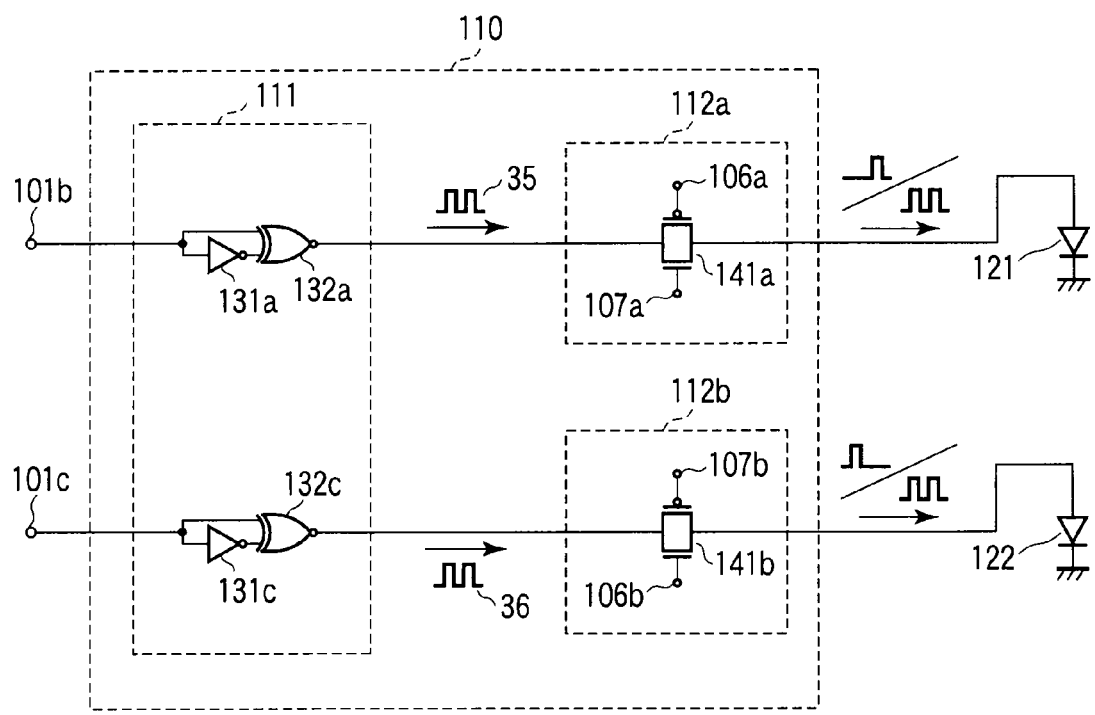
FIG. 14 is a diagram showing an example of the specific circuit configuration of the optical transmitter of FIG. 13.

An example of the specific circuit configuration of the optical transmitter of FIG. 13 is shown in FIG. 14. In the electrical short pulse generation circuit 111 of FIG. 14, an electrical pulse signal 35 corresponding to the rising and falling of a digital electrical input signal input to the input terminal 101*b* and an electrical pulse signal 36 corresponding to the rising and falling of a digital electrical input signal input to the input terminal 101*c* are generated.

In the first selection circuit 112*a* of FIG. 14, a negative-logic half clock is input to the terminal 106*a* of the complementary pass-gate 141*a* and a positive-logic half clock is input to the terminal 107*a*, and therefore, an electrical pulse signal corresponding to the rising of a digital electrical input signal input to the input terminal 101*b* is output in the first operation mode. Further, in the second operation mode, "0" and "1" are respectively input to the terminals 106*a*, 107*a* and, as a result, an electrical pulse signal 35 corresponding to the rising and falling of a digital electrical input signal input to the input terminal 101*a* is output.

On the other hand, in the second selection circuit 112*b*, a negative-logic half clock is input to the terminal 106*b* of the complementary pass-gate 141*b* and a positive-logic half clock is input to the terminal 107*b*, and therefore, an electrical pulse signal corresponding to the falling of a digital electrical input signal input to the input terminal 101*c* is output in the first operation mode. Further, in the second operation mode, "1" and "0" are respectively input to the terminals 106*b*, 107*b* and, as a result, an electrical pulse signal 36 corresponding to the rising and falling of a digital electrical input signal input to the input terminal 101*c* is output.

Thus, in this embodiment, even if the two input terminals (101*b*, 101*c*) of the digital electrical input signals are provided, first to fourth electrical pulse signals can be selectively output according to the operation mode like the second embodiment.

Fourth Embodiment

Figure 15:
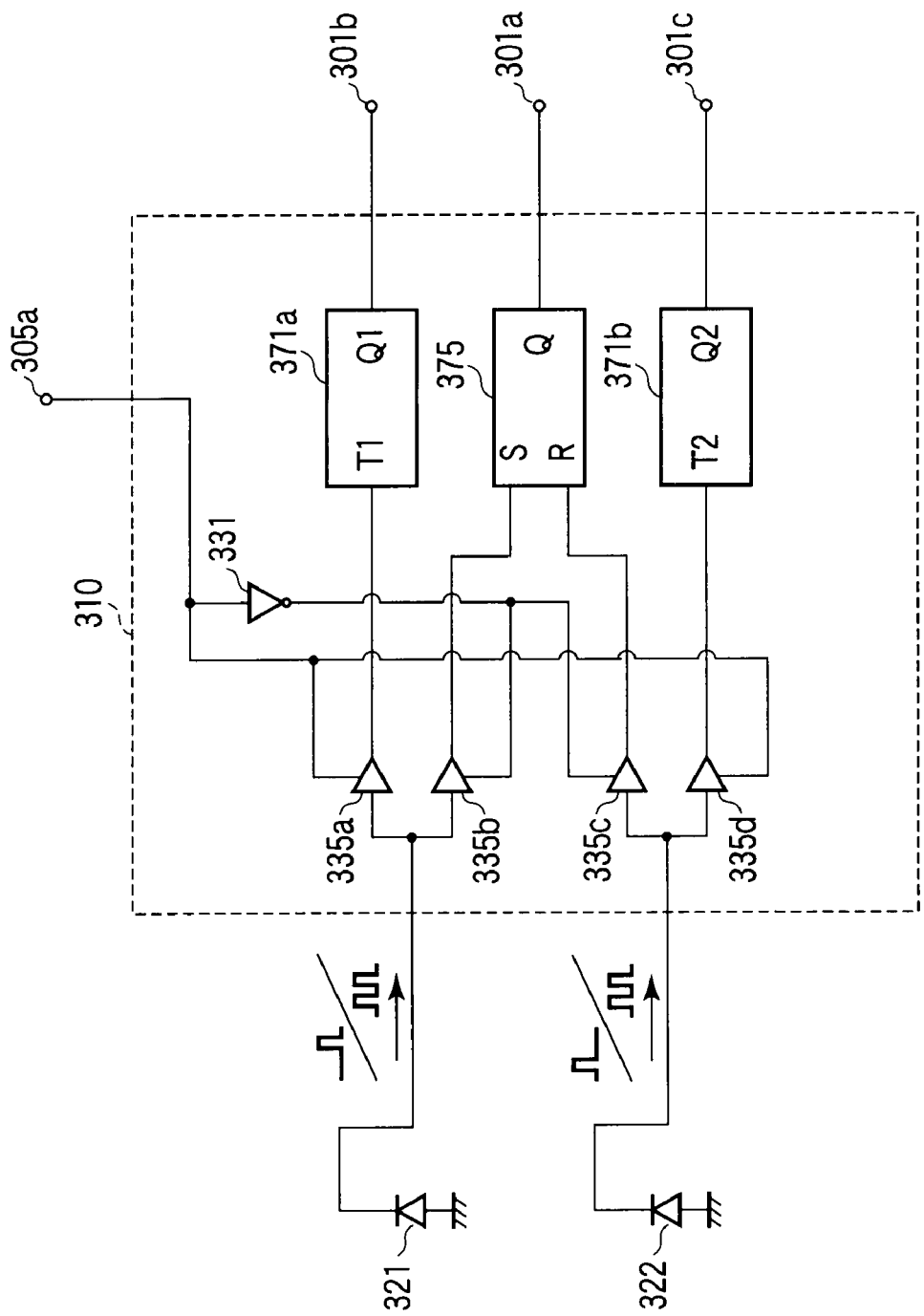
FIG. 15 is a diagram showing an example of the circuit configuration of an optical receiver of a complementary optical wiring apparatus according to a fourth embodiment.

An example of the circuit configuration of a receiving side of a complementary optical wiring apparatus according to a fourth embodiment of this invention is shown in FIG. 15. FIG. 15 shows the receiving circuit 310 of FIGS. 3A, 3B in detail.

In FIG. 15, symbols 301*a*, 301*b*, 301*c* indicate output terminals of digital electrical output signals, 335*a* to 335*d* tri-state buffers and 371*a*, 371*b* T flip-flops (second and third logic elements) each of which has a counter function and whose output is inverted in synchronization with the rising or falling of one input. A symbol 375 indicates an SR flip-flop (first logic element) that has a set/reset function whose output rises in response to the rising or falling of one of two inputs and falls in response to the rising or falling of the other one of the two inputs. A symbol 305*a* indicates a control terminal to which a control signal used to switch the first and second operation modes is input. A signal input to the control terminal 305*a* is supplied to the tri-state buffers 335*a*, 335*d* and supplied to the tri-state buffers 335*b*, 335*c* via an inverter 331.

FIG. 16 is a timing chart showing schematic waveforms of input and output voltages of the flip-flops 371*a*, 371*b*, 375 of FIG. 15.

In the optical receiver shown in FIG. 15, "0" is input to the control terminal 305*a* to set the tri-state buffers 335*a*, 335*d* into the high-impedance state in the first operation mode and the tri-state buffers 335*b*, 335*c* output respective input signals as they are. As a result, only the SR flip-flop 375 among the three flip-flops 371*a*, 371*b*, 375 is operated and a digital electrical output signal (Q in FIG. 16) is generated according to a first received electrical pulse signal (S in FIG. 16) and second received electrical pulse signal (R in FIG. 16).

On the other hand, in the second operation mode, "1" is input to the control terminal 305*a* to set the tri-state buffers 335*b*, 335*c* into the high-impedance state and the tri-state buffers 335*a*, 335*d* output respective input signals as they are. As a result, only the T flip-flops 371*a*, 371*b* among the three flip-flops 371*a*, 371*b*, 375 are operated, and a digital electrical output signal (Q1 in FIG. 16) is generated according to a first received electrical pulse signal (T1 in FIG. 16) and a digital electrical output signal (Q2 in FIG. 16) is generated according to a second received electrical pulse signal (T2 in FIG. 16).

Thus, the optical receiver shown in FIG. 15 can be operated by selectively switching the three flip-flops 371*a*, 371*b*, 375 that are operated according to the control signal input to the control terminal 305*a* and dynamically switching the first and second operation modes. It is preferable that an electric circuit such as a de-serializer arranged in the latter stage of the optical receiver shown in FIG. 15 may have three input terminals and an electrical signal input terminal corresponding to a digital electrical output signal in the first and second operation modes of the complementary optical wiring apparatus shown in FIG. 15.

Figure 18:
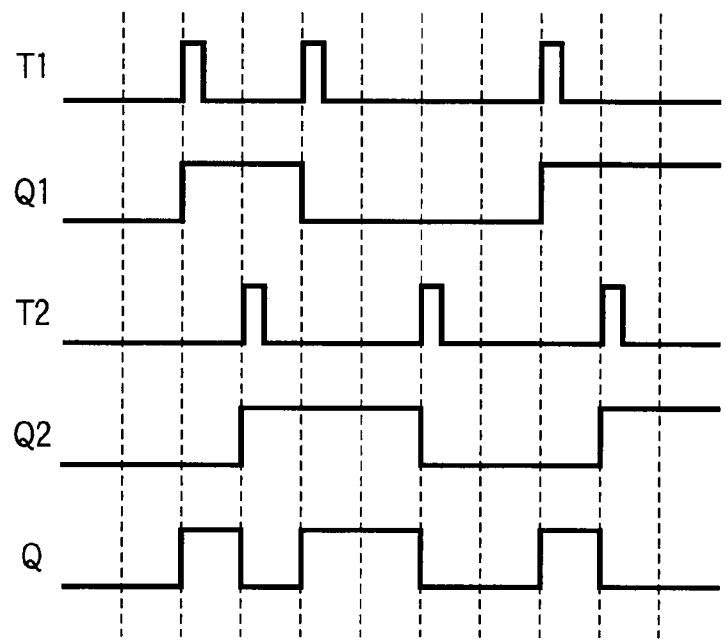
FIG. 18 is a timing chart showing schematic voltage waveforms in respective portions of the optical receiver of FIG. 17.

An example of the circuit configuration different from that of the optical receiver shown in FIG. 15 is shown in FIG. 17. A symbol 332 indicates an XOR circuit. FIG. 18 is a timing chart showing schematic waveforms of input and output voltages of the flip-flops 371a, 371b of FIG. 17 and a schematic output voltage waveform of the XOR circuit 332.

In the receiving circuit 310 of FIG. 17, a digital electrical output signal is obtained from the output terminal 301b according to a first received electrical pulse signal by means of the T flip-flop 371a and a digital electrical output signal is obtained from the output terminal 301c according to a second received electrical pulse signal by means of the T flip-flop 371b in the second operation mode as described before.

On the other hand, in the first operation mode, a digital electrical output signal (Q in FIG. 18) is obtained from the output terminal 301a by means of the XOR circuit 332 according to a digital electrical output signal (Q1 in FIG. 18) generated based on the received electrical pulse signal (T1 in FIG. 18) and a digital electrical output signal (Q2 in FIG. 18) generated based on the received electrical pulse signal (T2 in FIG. 18). The optical receiver shown in FIG. 17 does not have the SR flip-flop itself, but it should be noted that the set/reset function is realized by means of two T flip-flops and an XOR circuit.

Thus, in the optical receiver shown in FIG. 17, a digital electrical output signal is obtained from the output terminal 301a in the first operation mode and digital electrical output signals are respectively obtained from the output terminals 301b, 301c in the second operation mode.

Fifth Embodiment

An apparatus configured by arranging a plurality of complementary optical wiring apparatuses described above is simply explained as a fifth embodiment. In the former embodiments, the complementary optical wiring apparatus has two optical transmission lines. However, the degree of parallelization can be enhanced by arranging a plurality of complementary optical wiring apparatuses.

For example, parallel signal transmission using four optical transmission lines at maximum can be attained by arranging two complementary optical wiring apparatuses shown in FIG. 1. In this configuration, four digital electrical input signals can be transmitted by two complementary optical wiring apparatuses without serializer, or two digital electrical input signals can be transmitted by two complementary optical wiring apparatuses in low power with high reliability.

Sixth Embodiment

Figure 19:
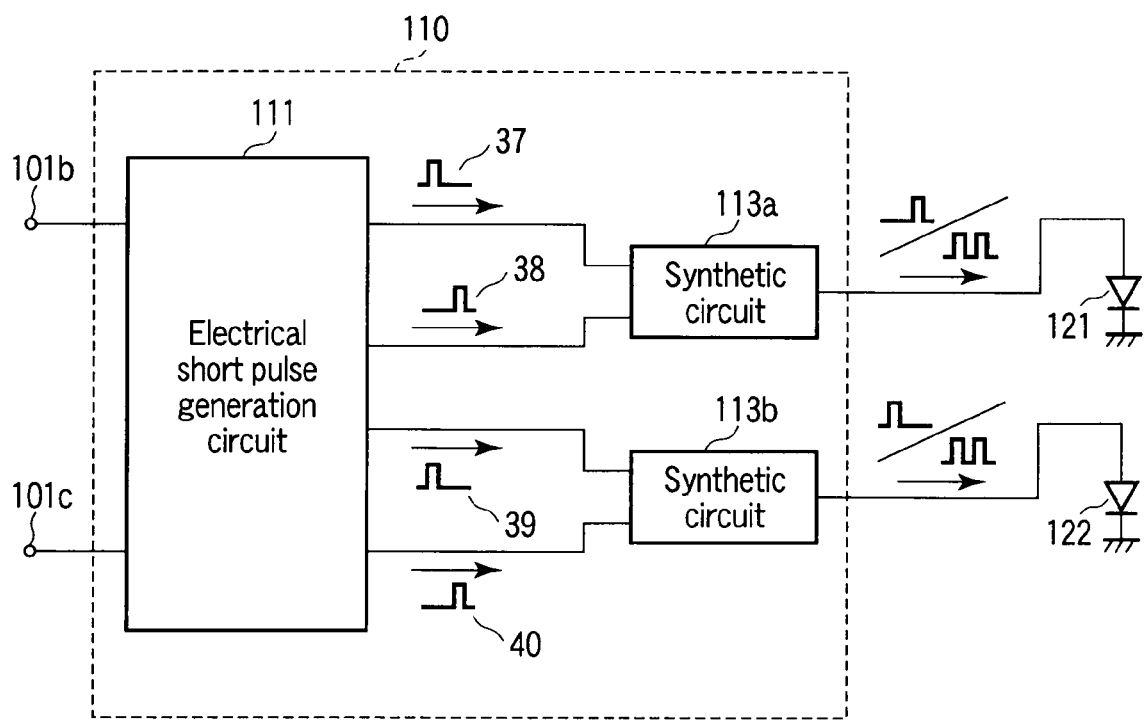
FIG. 19 is a diagram showing an example of the configuration of an optical transmitter of a complementary optical wiring apparatus according to a sixth embodiment.

An example of the configuration of a transmitting side of a complementary optical wiring apparatus according to a sixth embodiment of this invention is shown in FIG. 19. In FIG. 19, a symbol 37 indicates an electrical pulse signal (fourth auxiliary electrical pulse signal) corresponding to the falling of a digital electrical input signal 11b, 38 an electrical pulse signal (third auxiliary electrical pulse signal) corresponding to the rising of a digital electrical input signal 11a or 11b, 39 an electrical pulse signal (sixth auxiliary electrical pulse signal) corresponding to the falling of a digital electrical input signal 11a or 11c, and 40 an electrical pulse signal (fifth auxiliary electrical pulse signal) corresponding to the rising of the digital electrical input signal 11c. Further, symbols 113a, 113b respectively indicate first and second synthetic circuits.

In a transmitting circuit 110, a digital electrical input signal 11a is input to the input terminal 101b, 101c or both of the input terminals 101b and 101c in the first operation mode. A digital electrical input signal 11b is input to the input terminal 101b and a digital electrical input signal 11c is input to the input terminal 101c in the second operation mode.

An electric circuit such as a serializer arranged in the preceding stage of the transmitting side of the complementary optical wiring apparatus shown in FIG. 19 can be configured to appropriately switch an output in the first and second operation modes.

An electrical short pulse generation circuit 111 generates the electrical pulse signals 37 to 40 according to the digital electrical input signals 11a to 11c.

The first synthetic circuit 113a has input signals of electrical pulse signals 37 and 38 and can output one of the electrical pulse signal 38 and a signal obtained by synthesizing the electrical pulse signals 37 and 38. In the first operation mode, it outputs the electrical pulse signal 38 corresponding to the rising of the digital electrical input signal 11a. In the second operation mode, it synthesizes the electrical pulse signal 38 corresponding to the rising of the digital electrical input signal 11b with the electrical pulse signal 37 corresponding to the falling of the digital electrical input signal 11b and outputs an electrical pulse signal corresponding to the rising and falling of the digital electrical input signal 11b.

The second synthetic circuit 113b has input signals of electrical pulse signals 39 and 40 and can output one of the electrical pulse signal 39 and a signal obtained by synthesizing the electrical pulse signals 39 and 40. In the first operation mode, it outputs the electrical pulse signal 39 corresponding to the falling of the digital electrical input signal 11a. In the second operation mode, it synthesizes the electrical pulse signal 40 corresponding to the rising of the digital electrical input signal 11c with the electrical pulse signal 39 corresponding to the falling of the digital electrical input signal 11c and outputs an electrical pulse signal corresponding to the rising and falling of the digital electrical input signal 11c.

With the above configuration, optical signals generated from light-emitting elements 121, 122 can be switched according to the first and second operation modes.

Figure 20:
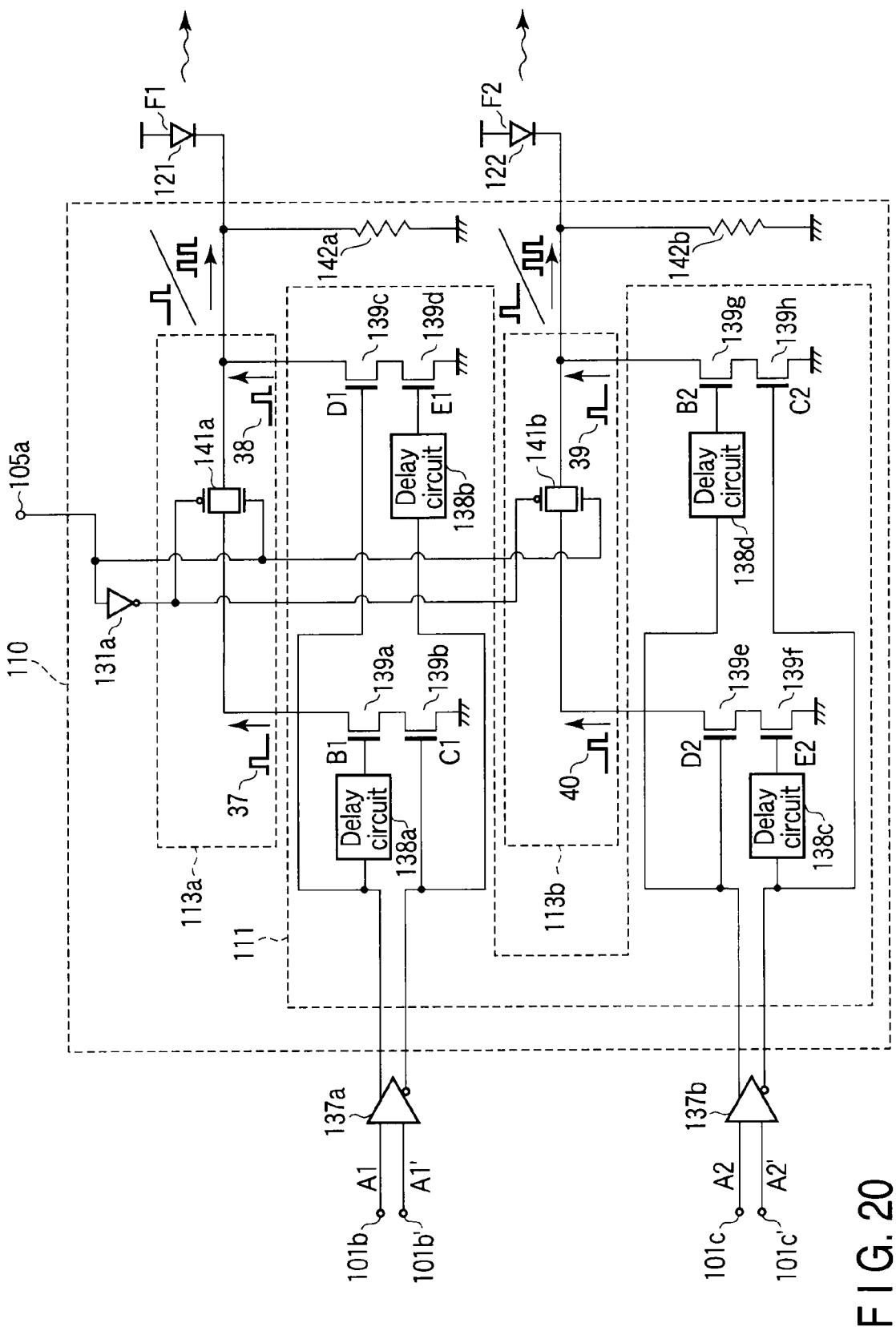
FIG. 20 is a diagram showing an example of the specific configuration of a transmitting side of the complementary optical wiring apparatus according to the sixth embodiment.

An example of the specific circuit configuration of the optical transmitter shown in FIG. 19 is shown in FIG. 20. In FIG. 20, symbols 101b and 101b' indicate differential input terminals of a digital electrical input signal 11b, 101c and 101c' differential input terminals of a digital electrical input signal 11c, and 105a a control terminal that inputs a control signal used to switch the first and second operation modes. Further, 131a indicates an inverter circuit, 137a and 137b differential buffer circuits, 138a to 138d delay circuits that delay signals by preset times, 139a to 139h nMOS transistors used to drive the first and second light-emitting elements 121 and 122, 141a and 141b complementary pass-gates, and 142a and 142b resistor elements used to supply bias currents through the first and second light-emitting elements 121, 122.

Figure 21:
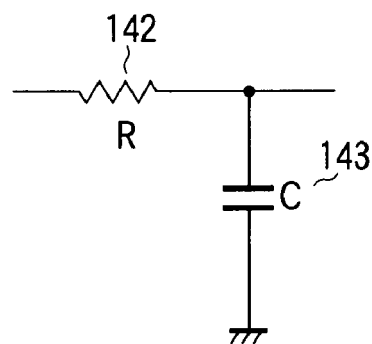
FIG. 21 is a diagram showing an example of a delay circuit used in the apparatus of FIG. 20.

Each of the delay circuits 138a to 138d may be a CR delay circuit configured by connecting a resistor element 142 and capacitor element 143 as shown in FIG. 21 or a buffer circuit configured by serially connecting an even number of inverter circuits.

Figure 22:
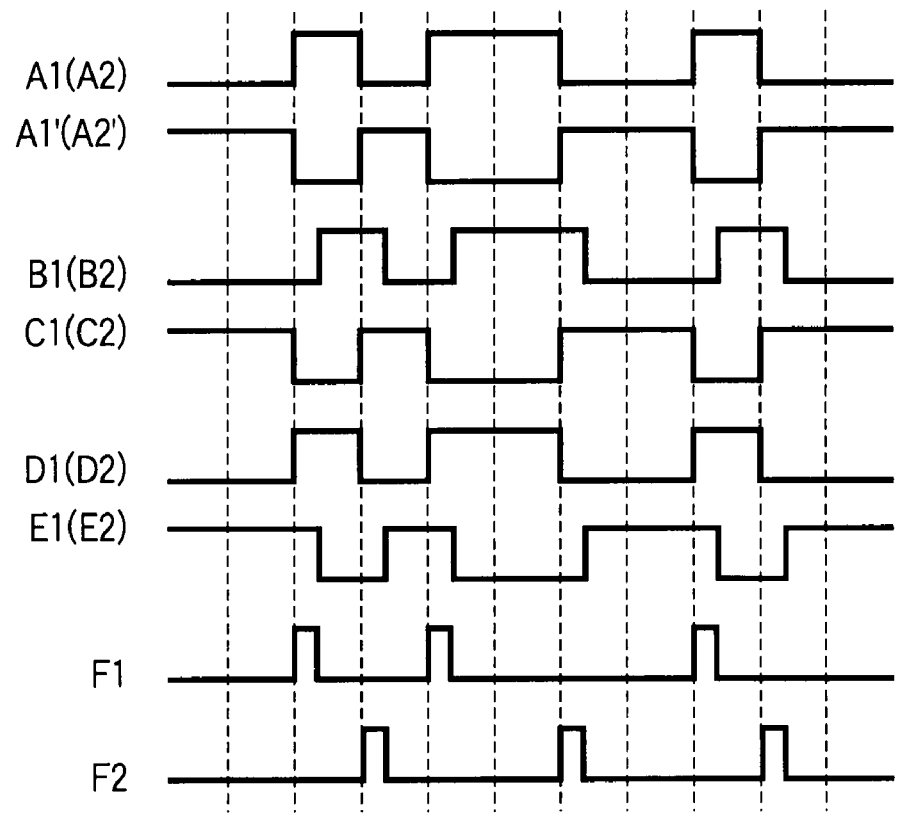
FIG. 22 is a timing chart showing schematic voltage, current or optical waveforms in respective portions of a first operation mode in the transmitting side of the apparatus of FIG. 20.
Figure 23:
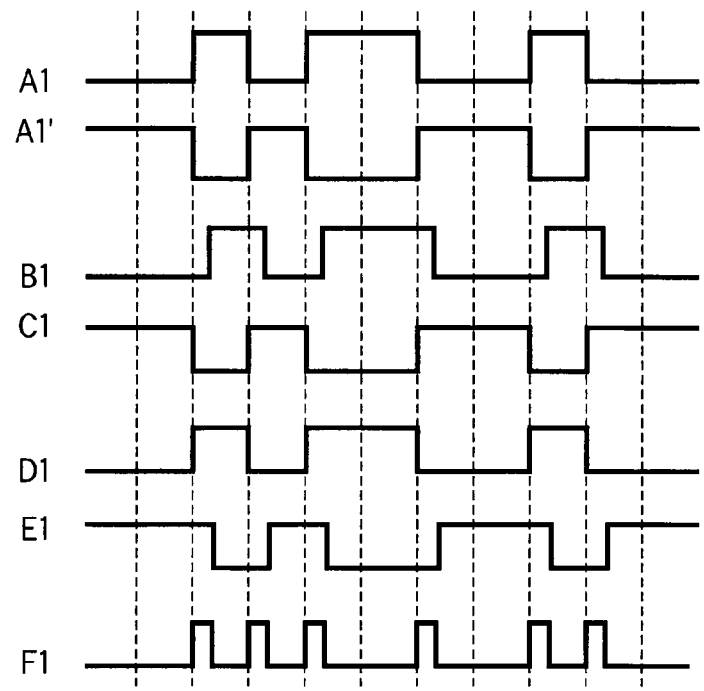
FIG. 23 is a timing chart showing schematic voltage, current or optical waveforms in respective portions of a second operation mode in the transmitting side of the apparatus of FIG. 20.
Figure 24:
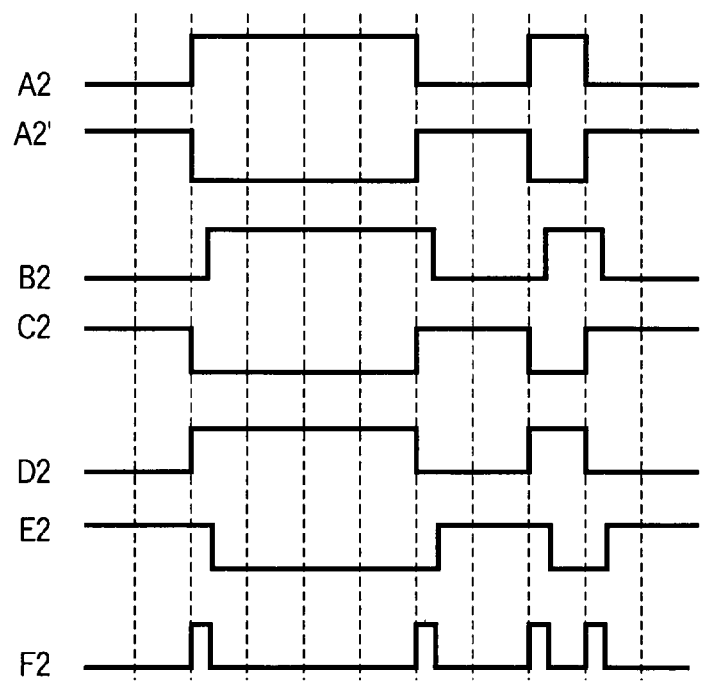
FIG. 24 is a timing chart showing schematic voltage, current or optical waveforms in respective portions of the second operation mode in the transmitting side of the apparatus of FIG. 20.

FIG. 22 is a timing chart showing schematic voltage, current or optical waveforms in respective portions A1 to F2 of FIG. 20 in the first operation mode. FIGS. 23 and 24 are timing charts showing schematic voltage, current or optical waveforms in the respective portions A1 to F2 of FIG. 20 in the second operation mode.

The transmitting circuit 110 shown in FIG. 20 has two differential input terminals and digital electrical input signals 11a (A1 (A2) and A1' (A2') in FIG. 22) are input to both of the differential input terminals 101b (101b') and 101c (101c') in the first operation mode. In the second operation mode, a digital electrical input signal 11b (A1 (A1') in FIG. 23) is input to the differential input terminal 101b (101b') and a digital electrical input signal 11c (A2 (A2') in FIG. 24) is input to the differential input terminal 101c (101c'). Therefore, it is preferable that an electric circuit such as a serializer arranged in the preceding stage of the transmitting side of the complementary optical wiring apparatus shown in FIG. 20 can be designed to appropriately switch an output in the first and second operation modes.

In the electrical short pulse generation circuit 111 of FIG. 20, a negative-logic digital electrical input signal (A1' in FIG. 22 or 23) among the digital electrical input signals (A1 and A1' in FIG. 22 or 23) input to the differential input terminals 101b and 101b' is delayed by the delay circuit 138b and the respective signals are used as gate input signals (D1 and E1 in FIG. 22 or 23) of the nMOS transistors 139c, 139d. The nMOS transistors 139c, 139d generate an electrical pulse signal 38 corresponding to the rising edge of the digital electrical input signal. Further, a positive-logic digital electrical input signal (A1 in FIG. 22 or 23) among the digital electrical input signals (A1 and A1' in FIG. 22 or 23) input to the differential input terminals 101b and 101b' is delayed by the delay circuit 138a and the respective signals are used as gate input signals (B1 and C1 in FIG. 22 or 23) of the nMOS transistors 139a, 139b. The nMOS transistors 139a, 139b generate an electrical pulse signal 37 corresponding to the falling edge of the digital electrical input signal.

On the other hand, a positive-logic digital electrical input signal (A2 in FIG. 22 or 24) among the digital electrical input signals (A2 and A2' in FIG. 22 or 24) input to the differential input terminals 101c and 101c' is delayed by the delay circuit 138d and the respective signals are used as gate input signals (B2 and C2 in FIG. 22 or 24) of the nMOS transistors 139g, 139h. The nMOS transistors 139g, 139h generate an electrical pulse signal 39 corresponding to the falling edge of the digital electrical input signal. Further, a negative-logic digital electrical input signal (A2' in FIG. 22 or FIG. 24) among the digital electrical input signals (A2 and A2' in FIG. 22 or 24) input to the differential input terminals 101c and 101c' is delayed by the delay circuit 138c and the respective signals are used as gate input signals (D2 and E2 in FIG. 22 or 24) of the nMOS transistors 139e, 139f. The nMOS transistors 139e, 139f generate an electrical pulse signal 40 corresponding to the rising edge of the digital electrical input signal.

In the synthetic circuit 113a of FIG. 20, "0" is input to the control terminal 105a and the complementary pass-gates 141a, 141b are set into the OFF state (the state in which the input and output are isolated) in the first operation mode. At this time, the synthetic circuit 113a outputs an electrical pulse signal 38, that is, an electrical pulse (F1 in FIG. 21) corresponding to the rising of the digital electrical input signal 11a to drive the first light-emitting element 121. In the second operation mode, "1" is input to the control terminal 105a and the complementary pass-gates 141a, 141b are set into the ON state (the state in which the input and output are short-circuited). At this time, the synthetic circuit 113a synthesizes the electrical pulse signal 37 with the electrical pulse signal 38 and outputs an electrical pulse (F1 in FIG. 23) corresponding to the rising and falling of the digital electrical input signal 11b to drive the first light-emitting element 121.

In the synthetic circuit 113b of FIG. 20, the complementary pass-gates 141a, 141b are set into the OFF state in the first operation mode. At this time, the synthetic circuit 113b outputs an electrical pulse signal 39, that is, an electrical pulse (F2 in FIG. 22) corresponding to the falling of the digital electrical input signal 11a to drive the second light-emitting element 122. In the second operation mode, the complementary pass-gates 141a, 141b are set into the ON state. At this time, the synthetic circuit 113b synthesizes the electrical pulse signal 39 with the electrical pulse signal 40 and outputs an electrical pulse (F2 in FIG. 24) corresponding to the rising and falling of the digital electrical input signal 11c to drive the second light-emitting element 122.

A case wherein the differential signal inputs are used in the above circuit is explained, but single-end signal inputs may be used. In this case, the differential buffers 137a, 137b may be replaced by differential amplifiers that can generate differential signals based on the single-end signal inputs.

MODIFICATION

This invention is not limited to the above embodiments. The circuits, circuit elements and function blocks of the complementary optical wiring apparatus of the above embodiments are provided only as examples and can be replaced by other circuits, circuit elements having the same functions and parts or part groups that configure the circuits. For example, as the light-emitting elements used in the above embodiments, various types of light-emitting elements such as light-emitting diodes or semiconductor lasers can be used if they are not particularly specified. Further, as the light-receiving elements, various types of light-receiving elements such as PIN photodiodes, MSM photodiodes, avalanche photodiodes or photoconductors can be used. In addition, the optical transmission line may be an optical fiber or optical waveguide. Further, the light-emitting element is not necessarily directly driven by the logic circuit, but may be driven to receive the amplification effect provided by MOS transistors or bipolar transistors. The input signal may be a differential signal or single-end signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A complementary optical wiring apparatus comprising:
   an optical transmitter that generates two optical signals according to at least one of two digital electrical input signals;
   a first optical transmission line that transmits one of the optical signals;
   a second optical transmission line that transmits the other optical signal; and
   an optical receiver that generates a digital electrical output signal having the same digital information as the digital electrical input signal based on the two optical signals received via the first and second optical transmission lines,
   wherein the optical transmitter has a first operation mode of transmitting an optical signal synchronized with a rising edge of the one digital electrical input signal to the first optical transmission line and transmitting an optical signal synchronized with a falling edge of the one digital electrical input signal to the second optical transmission line, and a second operation mode of transmitting an optical signal synchronized with rising and falling edges of one of the two digital electrical input signals to the first optical transmission line and transmitting an optical signal synchronized with rising and falling edges of the other one of the two digital electrical input signals to the second optical transmission line, and the optical transmitter is operated after one of the first and second operation modes is selected.

2. The apparatus according to claim 1, wherein the optical transmitter includes a transmitting circuit that generates two electrical pulse signals having a pulse width smaller than the minimum pulse width of the digital electrical input signal, a first light-emitting element that is driven by one of the electrical pulse signals to transmit an optical signal to the first optical transmission line, and a second light-emitting element that is driven by the other electrical pulse signal to transmit an optical signal to the second optical transmission line, and the transmitting circuit generates a first electrical pulse signal synchronized with the rising edge of the one digital electrical input signal to drive the first light-emitting element according to the first electrical pulse signal and generates a second electrical pulse signal synchronized with the falling edge of the one digital electrical input signal to drive the second light-emitting element according to the second electrical pulse signal in the first operation mode, and generates a third electrical pulse signal synchronized with the rising and falling edges of one of the two digital electrical input signals to drive the first light-emitting element according to the third electrical pulse signal and generates a fourth electrical pulse signal synchronized with the rising and falling edges of the other one of the two digital electrical input signals to drive the second light-emitting element according to the fourth electrical pulse signal in the second operation mode.

3. The apparatus according to claim 2, wherein the transmitting circuit includes an electrical short pulse generation circuit that generates the first to fourth electrical pulse signals, a first selection circuit that selects and outputs one of the first and third electrical pulse signals, and a second selection circuit that selects and outputs one of the second and fourth electrical pulse signals, the first selection circuit selects and outputs the first electrical pulse signal in the first operation mode, and selects and outputs the third electrical pulse signal in the second operation mode, the second selection circuit selects and outputs the second electrical pulse signal in the first operation mode and selects and outputs the fourth electrical pulse signal in the second operation mode.

4. The apparatus according to claim 3, wherein the electrical short pulse generation circuit has a first input terminal to which the one digital electrical input signal is input and second and third input terminals to which the two digital electrical input signals are input.

5. The apparatus according to claim 3, wherein the electrical short pulse generation circuit has a first input terminal to which one of the one digital electrical input signal and one of the two digital electrical input signals is input and a second input terminal to which one of the one digital electrical input signal and the other one of the two digital electrical input signals is input.

6. The apparatus according to claim 2, wherein the transmitting circuit includes an electrical short pulse generation circuit that has a first input terminal to which one of the one digital electrical input signal and one of the two digital electrical input signals is input, a second input terminal to which one of the one digital electrical input signal and the other one of the two digital electrical input signals is input, generates a first auxiliary electrical pulse signal synchronized with the rising and falling edges of the digital electrical input signal input to the first input terminal and generates a second auxiliary electrical pulse signal synchronized with the rising and falling edges of the digital electrical input signal input to the second input terminal, a first selection circuit that performs one of operations of selecting only a component of the first auxiliary electrical pulse signal that corresponds to the rising edge of the digital electrical input signal input to the first input terminal and outputting the first auxiliary electrical pulse signal as it is, and a second selection circuit that performs one of operations of selecting only a component of the second auxiliary electrical pulse signal that corresponds to the falling edge of the digital electrical input signal input to the second input terminal and outputting the second auxiliary electrical pulse signal as it is, the one digital electrical input signal is input to the first and second input terminals, the first electrical pulse signal is obtained in the first selection circuit by selecting only a component of the first auxiliary electrical pulse signal that corresponds to the rising edge of the one digital electrical input signal and the second electrical pulse signal is obtained in the second selection circuit by selecting only a component of the second auxiliary electrical pulse signal that corresponds to the falling edge of the one digital electrical input signal in the first operation mode, and one of the two digital electrical input signals is input to the first input terminal, the other one of the two digital electrical input signals is input to the second input terminal, the third electrical pulse signal is obtained in the first selection circuit by outputting the first auxiliary electrical pulse signal as it is and the fourth electrical pulse signal is obtained in the second selection circuit by outputting the second auxiliary electrical pulse signal as it is in the second operation mode.

7. The apparatus according to claim 2, wherein the transmitting circuit includes an electrical short pulse generation circuit that has a first input terminal to which one of the one digital electrical input signal and one of the two digital electrical input signals is input, a second input terminal to which one of the one digital electrical input signal and the other one of the two digital electrical input signals is input, generates a third auxiliary electrical pulse signal synchronized with the rising edge of the digital electrical input signal input to the first input terminal, a fourth auxiliary electrical pulse signal synchronized with the falling edge of the digital electrical input signal input to the first input terminal, a fifth auxiliary electrical pulse signal synchronized with the rising edge of the digital electrical input signal input to the second input terminal and a sixth auxiliary electrical pulse signal synchronized with the falling edge of the digital electrical input signal input to the second input terminal, a first synthetic circuit that performs one of operations of outputting the third auxiliary electrical pulse signal as it is and synthesizing the third auxiliary electrical pulse signal with the fourth auxiliary electrical pulse signal to output the thus synthesized signal, and a second synthetic circuit that performs one of operations of outputting the sixth auxiliary electrical pulse signal as it is and synthesizing the fifth auxiliary electrical pulse signal with the sixth auxiliary electrical pulse signal to output the thus synthesized signal, the one digital electrical input signal is input to the first and second input terminals, the first synthetic circuit outputs the third auxiliary electrical pulse signal and the second synthetic circuit outputs the sixth auxiliary electrical pulse signal in the first operation mode, and one of the two digital electrical input signals is input to the first input terminal, the other one of the two digital electrical input signals is input to the second input terminal, the first synthetic circuit synthesizes the third auxiliary electrical pulse signal with the fourth auxiliary electrical pulse signal to output the synthesized signal and the second synthetic circuit synthesizes the fifth auxiliary electrical pulse signal with the sixth auxiliary electrical pulse signal to output the synthesized signal in the second operation mode.

8. The apparatus according to claim 1, wherein the optical receiver includes a first light-receiving element that receives an optical signal obtained via the first optical transmission line and generates a first received electrical pulse signal, a second light-receiving element that receives an optical signal obtained via the second optical transmission line and generates a second received electrical pulse signal, and a receiving circuit that generates a digital electrical output signal based on the first and second received electrical pulse signals, the receiving circuit generates a digital electrical output signal having the same digital information as the one digital electrical input signal according to the first and second received electrical pulse signals in the first operation mode, and generates a digital electrical output signal having the same digital information as one of the two digital electrical input signals according to the first received electrical pulse signal and generates a digital electrical output signal having the same digital information as the other one of the two digital electrical input signals according to the second received electrical pulse signal in the second operation mode.

9. The apparatus according to claim 8, wherein the receiving circuit includes a first logic circuit whose output rises in response to one of the rising and falling edges of the first received electrical pulse signal and falls in response to one of the rising and falling edges of the second received electrical pulse signal, a second logic circuit whose output is inverted in synchronization with one of the rising and falling edges of the first received electrical pulse signal, and a third logic circuit whose output is inverted in synchronization with one of the rising and falling edges of the second received electrical pulse signal, the receiving circuit outputs a digital electrical output signal having the same digital information as the one digital electrical input signal by means of the first logic circuit in the first operation mode, and outputs a digital electrical output signal having the same digital information as one of the two digital electrical input signals by means of the second logic circuit and outputs a digital electrical output signal having the same digital information as the other one of the two digital electrical input signals by means of the third logic circuit in the second operation mode.

10. The apparatus according to claim 8, wherein the receiving circuit includes a first logic circuit whose output is inverted in synchronization with one of the rising and falling edges of the first received electrical pulse signal, a second logic circuit whose output is inverted in synchronization with one of the rising and falling edges of the second received electrical pulse signal, and a third logic circuit that outputs an exclusive logical OR value of outputs of the first and second logic circuits, the receiving circuit outputs a digital electrical output signal having the same digital information as the one digital electrical input signal by means of the third logic circuit in the first operation mode, and outputs a digital electrical output signal having the same digital information as one of the two digital electrical input signals by means of the first logic circuit and outputs a digital electrical output signal having the same digital information as the other one of the two digital electrical input signals by means of the second logic circuit in the second operation mode.

11. A complementary optical wiring apparatus comprising:
an optical transmitter that generates two optical signals according to at least one of two digital electrical input signals;
a first optical transmission line that transmits one of the optical signals;
a second optical transmission line that transmits the other optical signal; and
an optical receiver that generates a digital electrical output signal having the same digital information as the digital electrical input signal based on the two optical signals received via the first and second optical transmission lines,
wherein the optical transmitter has a first operation mode of transmitting an optical signal synchronized with a rising edge of the one digital electrical input signal to the first optical transmission line and transmitting an optical signal synchronized with a falling edge of the one digital electrical input signal to the second optical transmission line, and a second operation mode of transmitting an optical signal synchronized with rising and falling edges of one of the two digital electrical input signals to the first optical transmission line and transmitting an optical signal synchronized with rising and falling edges of the other one of the two digital electrical input signals to the second optical transmission line, and is operated after one of the first and second operation modes is selected,
the optical receiver generates a digital electrical output signal having the same digital information as the one digital electrical input signal based on optical signals obtained via the first and second optical transmission lines in the first operation mode, and generates a digital electrical output signal having the same digital information as one of the two digital electrical input signals based on an optical signal obtained via the first optical transmission line and generates a digital electrical output signal having the same digital information as the other one of the two digital electrical input signals based on an optical signal obtained via the second optical transmission line in the second operation mode.

12. The apparatus according to claim 11, wherein the optical transmitter includes a transmitting circuit that generates two electrical pulse signals having a pulse width smaller than the minimum pulse width of the digital electrical input signal, a first light-emitting element that is driven by one of the electrical pulse signals to transmit an optical signal to the first optical transmission line, and a second light-emitting element that is driven by the other electrical pulse signal to transmit an optical signal to the second optical transmission line, the transmitting circuit generates a first electrical pulse signal synchronized with the rising edge of the one digital electrical input signal to drive the first light-emitting element according to the first electrical pulse signal and generates a second electrical pulse signal synchronized with the falling edge of the one digital electrical input signal to drive the second light-emitting element according to the second electrical pulse signal in the first operation mode, and generates a third electrical pulse signal synchronized with the rising and falling edges of one of the two digital electrical input signals to drive the first light-emitting element according to the third electrical pulse signal and generates a fourth electrical pulse signal synchronized with the rising and falling edges of the other one of the two digital electrical input signals to drive the second light-emitting element according to the fourth electrical pulse signal in the second operation mode.

13. The apparatus according to claim 12, wherein the transmitting circuit includes an electrical short pulse generation circuit that generates the first to fourth electrical pulse signals, a first selection circuit that selects and outputs one of the first and third electrical pulse signals, and a second selection circuit that selects and outputs one of the second and fourth electrical pulse signals, the first selection circuit selects and outputs the first electrical pulse signal in the first operation mode and selects and outputs the third electrical pulse signal in the second operation mode, the second selection circuit selects and outputs the second electrical pulse signal in the first operation mode and selects and outputs the fourth electrical pulse signal in the second operation mode.

14. The apparatus according to claim 13, wherein the electrical short pulse generation circuit has a first input terminal to which the one digital electrical input signal is input and second and third input terminals to which the two digital electrical input signals are input.

15. The apparatus according to claim 13, wherein the electrical short pulse generation circuit has a first input terminal to which one of the one digital electrical input signal and one of the two digital electrical input signals is input, and a second input terminal to which one of the one digital electrical input signal and the other one of the two digital electrical input signals is input.

16. The apparatus according to claim 12, wherein the transmitting circuit includes an electrical short pulse generation circuit that has a first input terminal to which one of the one digital electrical input signal and one of the two digital electrical input signals is input, a second input terminal to which one of the one digital electrical input signal and the other one of the two digital electrical input signals is input, generates a first auxiliary electrical pulse signal synchronized with the rising and falling edges of the digital electrical input signal input to the first input terminal and generates a second auxiliary electrical pulse signal synchronized with the rising and falling edges of the digital electrical input signal input to the second input terminal, a first selection circuit that performs one of operations of selecting only the rising edge of the first auxiliary electrical pulse signal and outputting the first auxiliary electrical pulse signal as it is, and a second selection circuit that performs one of operations of selecting only the falling edge of the second auxiliary electrical pulse signal and outputting the second auxiliary electrical pulse signal as it is, the one digital electrical input signal is input to the first and second input terminals, the first electrical pulse signal is obtained in the first selection circuit by selectively outputting only the rising edge of the first auxiliary electrical pulse signal and the second electrical pulse signal is obtained in the second selection circuit by selectively outputting only the falling edge of the second auxiliary electrical pulse signal in the first operation mode, and one of the two digital electrical signals is input to the first input terminal, the other one of the two digital electrical signals is input to the second input terminal, the third electrical pulse signal is obtained in the first selection circuit by outputting the first auxiliary electrical pulse signal as it is and the fourth electrical pulse signal is obtained in the second selection circuit by outputting the second auxiliary electrical pulse signal as it is in the second operation mode.

17. The apparatus according to claim 12, wherein the transmitting circuit includes an electrical short pulse generation circuit that has a first input terminal to which one of the one digital electrical input signal and one of the two digital electrical input signals is input and a second input terminal to which one of the one digital electrical input signal and the other one of the two digital electrical input signals is input and generates a third auxiliary electrical pulse signal synchronized with the rising edge of the digital electrical input signal input to the first input terminal, a fourth auxiliary electrical pulse signal synchronized with the falling edge of the digital electrical input signal input to the first input terminal, a fifth auxiliary electrical pulse signal synchronized with the rising edge of the digital electrical input signal input to the second input terminal and a sixth auxiliary electrical pulse signal synchronized with the falling edge of the digital electrical input signal input to the second input terminal, a first synthetic circuit that performs one of operations of outputting the third auxiliary electrical pulse signal as it is and synthesizing the third auxiliary electrical pulse signal with the fourth auxiliary electrical pulse signal to output the thus synthesized signal, and a second synthetic circuit that performs one of operations of outputting the sixth auxiliary electrical pulse signal as it is and synthesizing the fifth auxiliary electrical pulse signal with the sixth auxiliary electrical pulse signal to output the thus synthesized signal, the one digital electrical input signal is input to the first and second input terminals, the first synthetic circuit outputs the third auxiliary electrical pulse signal and the second synthetic circuit outputs the sixth auxiliary electrical pulse signal in the first operation mode, and one of the two digital electrical input signals is input to the first input terminal, the other one of the two digital electrical input signals is input to the second input terminal, the first synthetic circuit synthesizes the third auxiliary electrical pulse signal with the fourth auxiliary electrical pulse signal to output the thus synthesized signal and the second synthetic circuit synthesizes the fifth auxiliary electrical pulse signal with the sixth auxiliary electrical pulse signal to output the thus synthesized signal in the second operation mode.

18. The apparatus according to claim 11, wherein the optical receiver includes a first light-receiving element that receives an optical signal obtained via the first optical transmission line and generates a first received electrical pulse signal, a second light-receiving element that receives an optical signal obtained via the second optical transmission line and generates a second received electrical pulse signal, and a receiving circuit that generates a digital electrical output signal according to the first and second received electrical pulse signals, the receiving circuit generates a digital electrical output signal having the same digital information as the one digital electrical input signal according to the first and second received electrical pulse signals in the first operation mode, and generates a digital electrical output signal having the same digital information as one of the two digital electrical input signals according to the first received electrical pulse signal and generates a digital electrical output signal having the same digital information as the other one of the two digital electrical input signals according to the second received electrical pulse signal in the second operation mode.

19. The apparatus according to claim 18, wherein the receiving circuit includes a first logic circuit whose output rises in response to one of the rising and falling edges of the first received electrical pulse signal and falls in response to one of the rising and falling edges of the second received electrical pulse signal, a second logic circuit whose output is inverted in synchronization with one of the rising and falling edges of the first received electrical pulse signal, and a third logic circuit whose output is inverted in synchronization with one of the rising and falling edges of the second received electrical pulse signal, the receiving circuit outputs a digital electrical output signal having the same digital information as the one digital electrical input signal by means of the first logic circuit in the first operation mode, and outputs a digital electrical output signal having the same digital information as one of the two digital electrical input signals by means of the second logic circuit and outputs a digital electrical output signal having the same digital information as the other one of the two digital electrical input signals by means of the third logic circuit in the second operation mode.

20. The apparatus according to claim 18, wherein the receiving circuit includes a first logic circuit whose output is inverted in synchronization with one of the rising and falling edges of the first received electrical pulse signal, a second logic circuit whose output is inverted in synchronization with one of the rising and falling edges of the second received electrical pulse signal, and a third logic circuit that outputs an exclusive logical OR value of outputs of the first and second logic circuits, the receiving circuit outputs a digital electrical output signal having the same digital information as the one digital electrical input signal by means of the third logic circuit in the first operation mode, and outputs a digital electrical output signal having the same digital information as one of the two digital electrical input signals by means of the first logic circuit and outputs a digital electrical output signal having the same digital information as the other one of the two digital electrical input signals by means of the second logic circuit in the second operation mode.

* * * * *